United States Patent
Van Alstyne

(10) Patent No.: US 7,486,188 B2
(45) Date of Patent: Feb. 3, 2009

(54) SYSTEM, ARTICLE AND METHOD FOR TRACKING AN INVENTORY

(76) Inventor: Peter C. Van Alstyne, 433 Clinton St., Brooklyn, NY (US) 11231

( * ) Notice: Subject to any disclaimer, the term of this patent is extended or adjusted under 35 U.S.C. 154(b) by 493 days.

(21) Appl. No.: 11/389,749

(22) Filed: Mar. 27, 2006

(65) Prior Publication Data
US 2006/0290471 A1 Dec. 28, 2006

Related U.S. Application Data

(60) Provisional application No. 60/694,295, filed on Jun. 27, 2005, provisional application No. 60/760,001, filed on Jan. 18, 2006.

(51) Int. Cl.
*G08B 13/14* (2006.01)
(52) U.S. Cl. .............. 340/572.1; 340/505; 340/527; 340/539.1; 340/539.13; 340/539.32; 340/5.91; 340/5.92; 340/10.1
(58) Field of Classification Search ............ 340/505, 340/506, 527, 539.1, 539.23, 539.32, 568.1, 340/571, 3.1, 825.36, 825.49, 5.91, 5.92, 340/5.9, 10.1, 572.1
See application file for complete search history.

(56) References Cited

U.S. PATENT DOCUMENTS

| | | | | |
|---|---|---|---|---|
| 4,940,974 A | * | 7/1990 | Sojka | 340/10.2 |
| 6,040,781 A | * | 3/2000 | Murray | 340/825.22 |
| 6,708,879 B2 | * | 3/2004 | Hunt | 235/385 |
| 2004/0034581 A1 | * | 2/2004 | Hill et al. | 705/28 |
| 2004/0220869 A1 | * | 11/2004 | Perera | 705/37 |
| 2008/0052200 A1 | * | 2/2008 | Bodin et al. | 705/28 |
| 2008/0183599 A1 | * | 7/2008 | Hill et al. | 705/28 |

* cited by examiner

*Primary Examiner*—Daryl C Pope
(74) *Attorney, Agent, or Firm*—Howard IP Law Group, PC

(57) ABSTRACT

The present invention pertains to a storage facility containing consumable items that updates an inventory when items are stored, removed and consumed. A product scanner and a computer installed in the facility use RFID technology to determine if an item has been consumed or removed from a locale. Items in the facility have RFID tags attached. The system interrogates the tags and if a tag becomes disabled, displaced or non-existent due to consumption or removal from a locale the system provides instantaneous status. The computer transmits consumption information to a central location for billing, inventory management, market research information and can transmit the same to other processing units such as hand held computers possessed by staff that replenishes the facility. This system prevents used items from being placed back into the housing facility and being incorrectly accounted for as usable/billable and provides for greater room servicing efficiencies.

25 Claims, 18 Drawing Sheets

TOP VIEW

SIDE VIEW

SYSTEM, ARTICLE AND METHOD FOR TRACKING AN INVENTORY

CROSS-REFERENCE TO RELATED APPLICATIONS

This application claims the benefit under 35 U.S.C. 119 (e) of U.S. Provisional Application Ser. No. 60/694,295, filed Jun. 27, 2005 and U.S. Provisional Application Ser. No. 60/760,001, filed Jan. 18, 2006.

FIELD OF THE INVENTION

The invention generally relates to the field of inventory stores, such as storage facilities, or commercial mini bars for beverages, snacks, gifts, sundries and other consumables.

DESCRIPTION OF THE PRIOR ART

Various portable cosmetic and toilet article cases have been disclosed that carry toiletries, medicines and other sundry articles. Examples are disclosed in U.S. Pat. Nos. 6,886,695, 6,854,472, 6,796,431 and 5,318,053. Other examples include U.S. Pat. Nos. 1,613,536, 1,828,863 and 5,163,457. Without limiting the present invention, it is believed to be desirable to provide a cabinet that is easily transportable within and between locations and that blends into the reflective properties of a generally larger mirror or mirrored cabinet upon which it may be installed. However, portable cabinets typically are unsophisticated and are not equipped to accomplish automatic inventory tracking. Therefore, it may prove desirable to provide a cabinet that may be adapted for a variety of applications, ranging from a sundry or medicine dispenser to a vanity, with minimal redesign or manufacturing tooling, as well as have the features of maintaining a record of its inventory.

Gibb, WO 2005/015510A1, discloses a computerized-sensing system for a mini bar in a hotel room with a dispenser. The entire disclosure of Gibb is hereby incorporated by reference as if being set forth in its entirety herein. Linton, US 20040232231A1, discloses a radio frequency identification method and system of distributing product from a micro-warehouse with a door. The entire disclosure of Linton is hereby incorporated by reference as if being set forth in its entirety herein.

Kipp, US 20050051624A1 discloses an apparatus and method for detecting tampering with containers and preventing counterfeiting, especially as such tampering is detected by removal of a cap, however it does not address how such a system would operate in the larger context of a system designed to track an inventory.

Without limiting the present invention, it is believed to be desirable to maintain a real time inventory control for items that are dispensed from any inventory storage facility such as industrial inventory storage facilities, cabinets or in-room containments, but where the items may not have been used, and which may be subsequently returned to the inventory. Likewise, it is believed to be desirable to maintain a real time inventory control for items that are dispensed from a containment and subsequently used. Also, it may prove desirable to inventory accounts or reduce billing errors that are caused by items being moved from containments but not used. Also, it may prove desirable to create additional point of sale opportunities in applications such as hotel rooms. Additionally, it may prove desirable to increase efficiency by reducing staff costs associated with entering dwellings, checking the level of inventory related to sundries and/or consumables, and identify missing items, without having to keep track of an exact location within the room. Additionally, it may prove desirable to provide a remote inventory in real time (or substantially real time), while preventing unnecessary physical checking of items or unnecessary disturbing of guests; the latter occurring when hotel service personnel have to knock on a hotel room door in order to determine if a replacement sundry is necessary or if a room is vacant.

Radio frequency identification device ("RFID") technology allows data to be transmitted by a product containing an RFID tag, which is read by an RFID transceiver. The data transmitted can provide identification about the product, such as date of purchase. RFID technology does not require contact or even line-of-sight to be read. Passive RFID tags can be as small as 0.3 mm and do not require batteries since they are powered by the radio frequency signal of a RFID transceiver. Passive RFID tags can be read from a distance of about 30 feet and it is anticipated that as RFID technology improves passive RFID's will be read from further and further distances. Semi-passive RFID tags contain a small battery that boosts the range. To track an inventory in a hotel room especially to ascertain its use would prove to be am improvement of the current method of physical inspection to ascertain if a product has been used.

SUMMARY OF THE INVENTION

The present invention pertains to an inventory store, such as a mini bar, a safe, a room, or other containment holding items that automatically records items being placed in and removed from an inventory storage, and thereby maintains a real-time inventory. A product scanner and a computer installed in the container, or in the proximity of the container, indicate that an item has been placed, removed or returned by a service worker, or patron to provide at least one of billing, inventory management, point of sale advertisement and market research information.

One aspect of the invention includes a system for tracking inventory comprising: an inventory store such as a mini bar; one or more transceivers for interrogating one or more RFIDs associated with one or more articles; a processor in communication with the transceivers; code operable by the processor to increase the inventory when the one or more articles enter the inventory store; code operable by the processor to initiate a timer when the one or more articles are removed from the inventory store; code operable by the processor to decrease the inventory if one or more transceiver interrogations of a field indicate that the one or more articles removed from the inventory store does not respond to the interrogation or have been used; and whereby if one or more transceiver interrogations of a field indicate that the one or more articles removed from the inventory store have not been used, then the inventory is unchanged for the responding one or more articles provided that the timer has not timed out.

According to an aspect of the present invention, a microprocessor transmits information as to the removal of an item for sale to a central location in the facility, such as a hotel front desk or other central processing unit, and to a hand held computer possessed by personnel, such as a hotel staff.

According to another aspect, an RFID tag is utilized on item packaging to track items for sale, and is adapted to be destroyed, i.e., have the responsiveness to RF interrogation signaling disabled, when a user consumes the item. Destroying the tag occurs upon opening the package of a purchased item and indicates to the microprocessor via the RF interrogation the item no longer exists. This prevents an item being placed back into the housing facility and being incorrectly accounted for as usable/billable.

According to another aspect of the invention, a pair of RFID tags are utilized on one package to track when the item has been opened for consumption. When one of the packaging components, such as a cap is disassociated from the second component, such as a bottle, a transceiver that interrogates RFID tags detects the resulting displacement. The system subsequently accounts for the item having been used and generates a corresponding line item in a related customer bill.

In yet another aspect of the invention, an RFID transmitting device interrogates RFID tags affixed to product packaging, determines on a regular cycle the inventory resident, and not destroyed within an area, such as a hotel room.

BRIEF DESCRIPTION OF THE DRAWINGS

The invention may be understood from the following detailed description when read in connection with the accompanying drawings. The various features of the drawings are not specified exhaustively. On the contrary, the various features may be arbitrarily expanded or reduced for clarity. Included in the drawings are the following figures.

DETAILED DESCRIPTION OF THE INVENTION

In the figures to be discussed, the circuits and associated blocks and arrows represent functions of a process according to an aspect of the present invention, which may be implemented as electrical circuits and associated wires or data busses, which transport electrical signals. Alternatively, one or more associated arrows may represent communication (e.g., data flow) between software routines, and/or computing devices, particularly when the present method or apparatus of the present invention is embodied, in whole or part, as a digital process.

Figure 1:
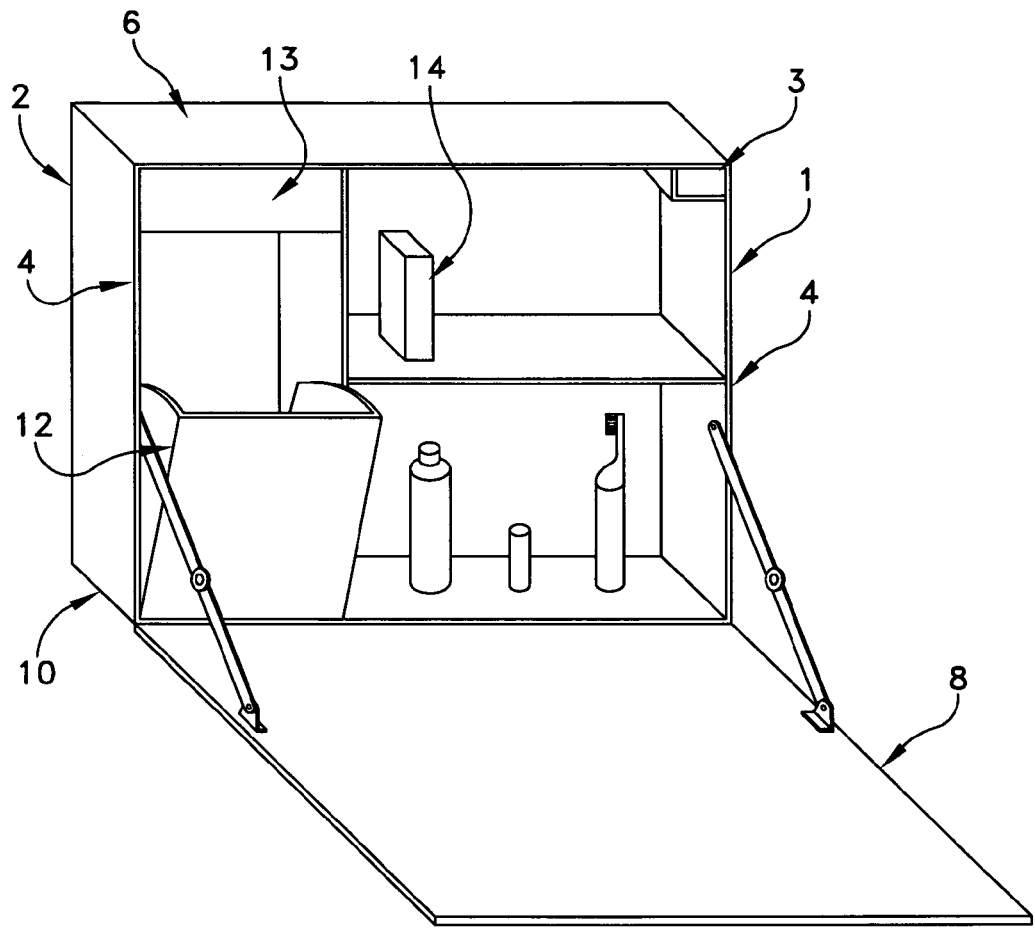
FIG. 1 illustrates a perspective view of an empty configuration of a container according to an aspect of the present invention.

The present invention is particularly useful in connection with a facility where items are stored in a permanent inventory store or portable inventory store such as a container, a bathroom cabinet, a mini-bar, amenity basket, safe, entire hotel room/suite or other form of security storage box. The present invention will be discussed as it relates to sundry containers for non-limiting purposes of explanation only. As shown in FIG. 1, one embodiment of the invention is a sundry container having an inventory management system (not shown), such as by way of example and not limitation, a hotel bathroom. A user of the container pushes a mirror for frontal access, such that a front panel lowers via a gas cylinder-spring to a tray position. The opened container reveals various toiletry items available for convenient purchase. The compartments can be easily removed and replaced by other compartmentalized interiors that suit its utility without significant re-design (e.g., cosmetic shelving, medication dispenser, shaving kit, contact lens organizer, etc.). By way of non-limiting example only, the sundry container may be secured to a stationary mirror or medicine chest mirror using a double-sided strong adhesive tape or 3M Dual Lock or Velcro (each Trademarks of 3M Corporation) tape. This allows for easy installation regardless of technical know-how. In the illustrated embodiment, the sundry container has mirrors on all sides so as to be aesthetically pleasing to the eye, particularly when installed on a mirror.

FIG. 1 represents a perspective view of the empty configuration of an apparatus according to an aspect of the present invention. A compact cabinet 1 includes: a back panel 2; two side panels 4, each having a mirrored surface; a top panel 6 that may also be mirrored; a bottom panel 10, and a hinged front panel 8, that may be mirrored and when pushed, opens outward, collectively defining an interior cavity. The mirrored surfaces may optionally include magnification optical properties, to enlarge the view of reflected objects, and may optionally be magnetized to hold metal objects.

One or more vertically oriented compartments 12 in the internal cavity may optionally have a spring loaded or otherwise hinged panel. By way of non-limiting further example, compartment 12 may be configured such that it opens with an outward motion, so that when main body front panel 8 is opened the prior restraint offered by the front panel 8 is removed, thus allowing the one or more vertically oriented compartments 12 to spring forward and open.

In yet another embodiment, the front panel 8 may include a hinge system that permits the front panel 8 to open either into a horizontal tray position or at a right angle.

Figure 2A:
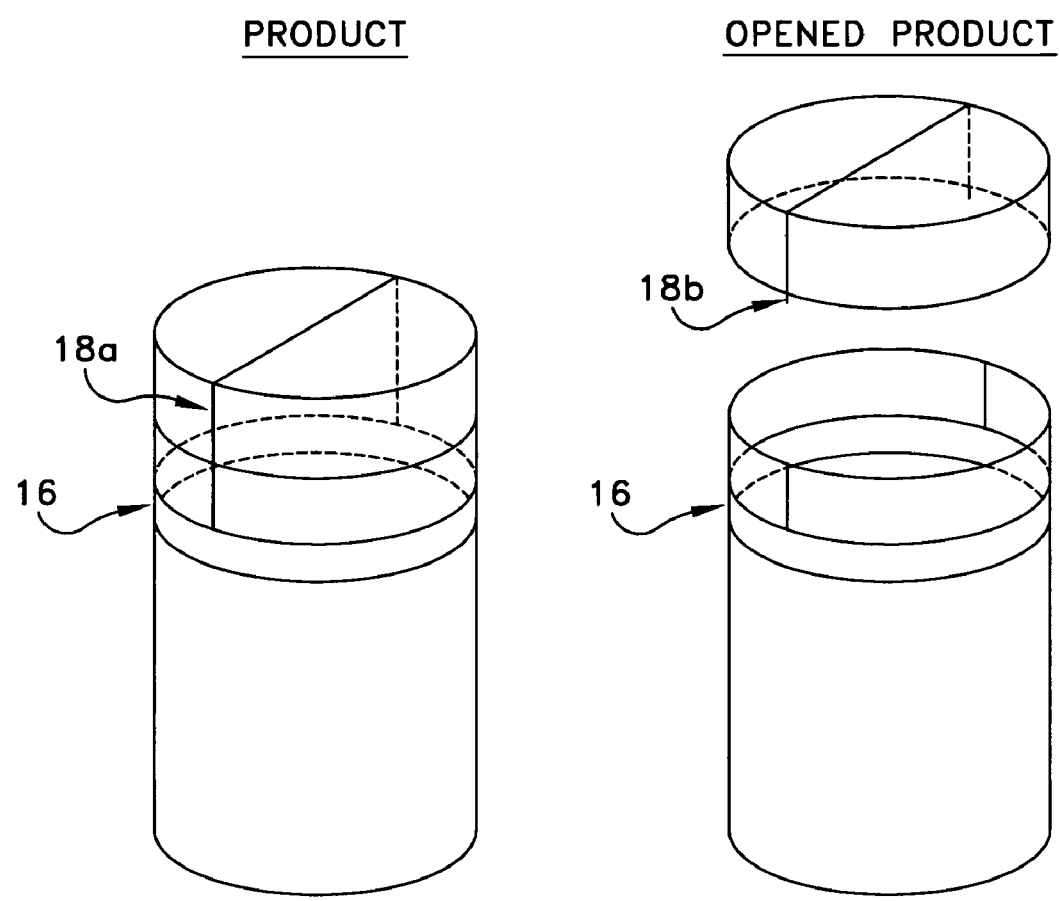
FIG. 2a illustrates a sundry having a disabled RFID tag incorporating product package in accordance with an aspect of the present invention.
Figure 2B:
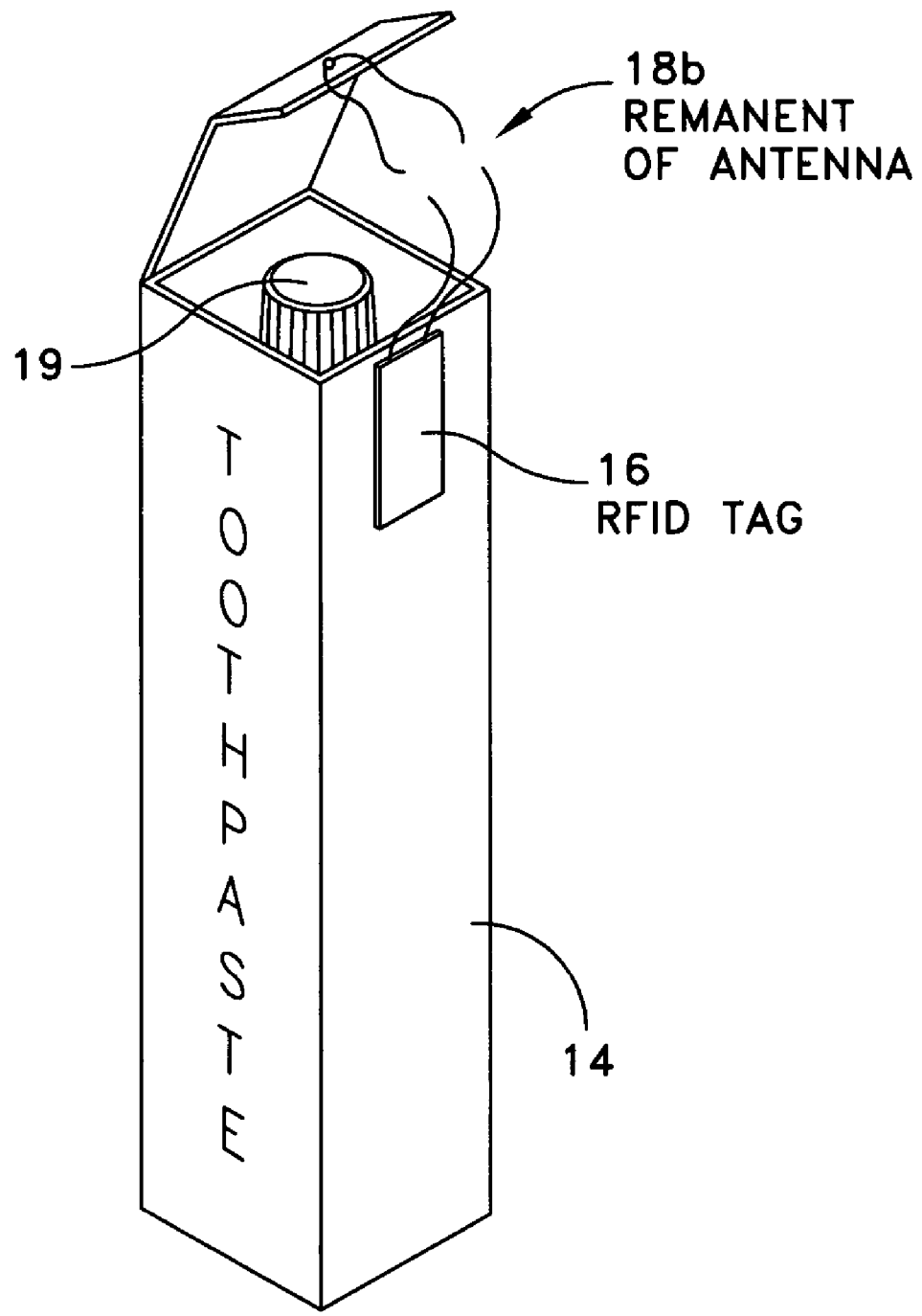
FIG. 2b illustrates a sundry having a disabled RFID tag incorporating product package in accordance with an aspect of the present invention.

The cabinet 1 illustrated in FIG. 1 stores and inventories, by way of example, sundry items such as is illustrated in FIG. 2a and FIG. 2b. The cabinet 1 includes one or more processors 13 and one or more RFID scanners or transceivers (hereinafter referred to as transceivers) 3 to track product entering and leaving its enclosure. Each product resident in cabinet 1 is outfitted with an RFID tag. In FIG. 2b a product package 14 contains a consumable product, which in the illustrative example, is a tube of toothpaste 19. Affixed to box 14 is an RFID tag 16. The RFID tag 16 is utilized to provide Stock Keeping Unit ("SKU") identification or location information, and other specifics about the product tagged, such as price, color, date of purchase, etc.

In a non-limiting embodiment, RFID tag 16 contains a microchip (such as a silicon chip) and antenna that allow it to receive and respond to radio-frequency interrogations from an RFID transceiver. Each RFID tag uniquely identifies the product to which it is attached. RFID tag 16 is scanned to retrieve the identifying information.

According to an aspect of the present invention, passive RFID tags, e.g., RFID tags having no internal power supply, may be utilized, e.g., as tag 16 for product 19 as shown in FIG. 2b. As shown in FIG. 2a, minute electrical currents induced in the RFID tag antenna 18a from incoming radio frequency (RF) signals power a CMOS integrated circuit located in the tag to both power up and transmit a response. Passive tags conventionally signal by backscattering the carrier signal from the transceiver, such that the antenna both collects power from the incoming signal and also transmits the outbound backscatter signal. Passive tags conventionally have practical read distances ranging from about 2 mm (ISO 14443) up to about a few meters (ISO 18000-6), depending on the chosen radio frequency. Conventional transceiver RFID technology can be used in a frequency range of about 800 MHz to about 1 GHz. In many products the low power consumption enables read performances extended to distances up to 10 meters. Conventional RFID technology also features simultaneous operation of multiple tags employing anti-collision methods such that up to 460 tags per second can be reliably read. RFID chips typically carry a maximum 2,000 bytes of data, although more complicated RFID tags having greater storage and or processing capabilities may be used.

Figure 3A:
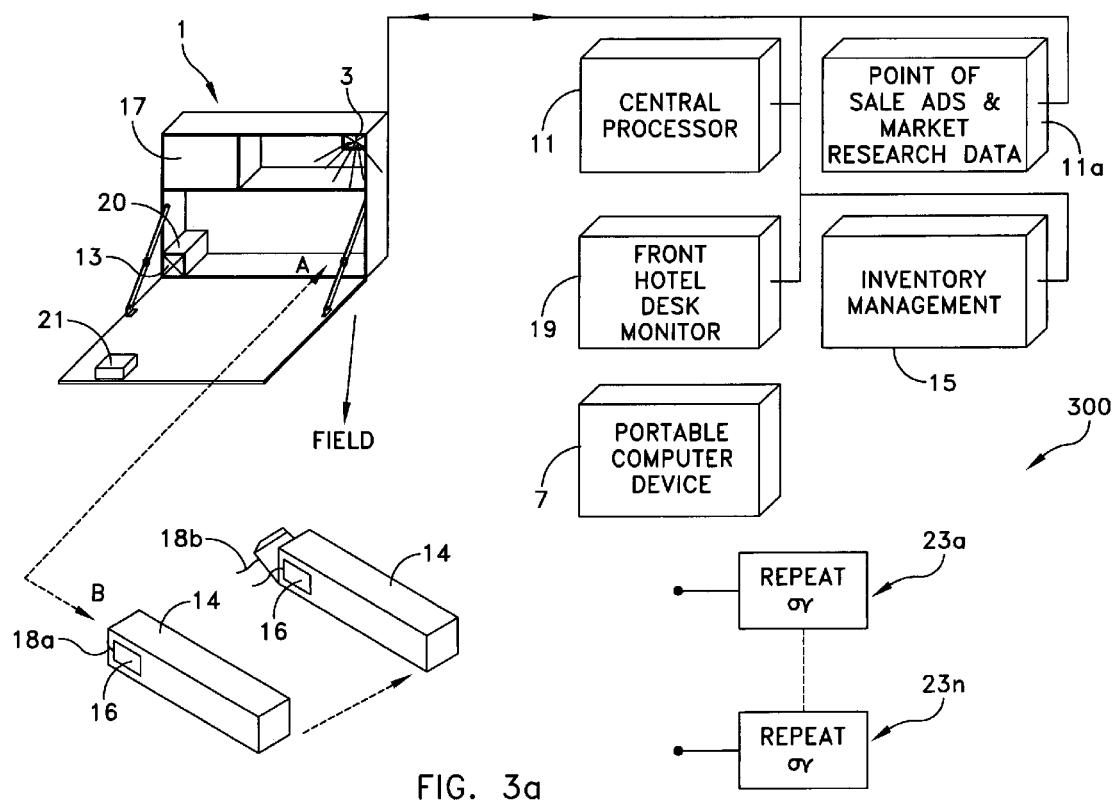
FIG. 3a illustrates a system for dispensing and inventorying consumables in accordance with an aspect of the present invention.

FIG. 3a illustrates a system 300 for creating and tracking an inventory comprising: a inventory store 1, a transceiver 3 for interrogating a RFID tag 16 associated with a consumable article such as sundry 14. A processor 13 in inventory store 1 communicates with the transceiver 3 such that when the one or more articles enter the inventory store 1 the RFID tag 16 in response to the transceiver 3 interrogation, communicates with the transceiver 3, and in response thereto the transceiver 3 communicates with the processor 13 having code operable by the processor 13 to increase the inventory. The articles in the inventory store 1 are also detected when they are removed from the cabinet during a selection by a transceiver. The detection can optionally cause a timer to initiate a timeout stored in the processor 13 memory. Such timers can be implemented in hardware or in software as resident in processor 13. If the RFID tag of one or more articles removed from the inventory store 1 do not respond to the transceiver 3 interrogation then the processor 13 having code operable by the processor 13 decreases the inventory; and likewise if the RFID tag of one or more articles removed from the cabinet 1 responds to the transceiver 3 interrogation then the transceiver is not billed.

More particularly as shown in FIG. 3a, product package 14 having affixed thereto an RFID tag 16 is stored in inventory store 1. When package 14 is selected by a user and removed from the sundry inventory store 1 into a room as indicated by the designation FIELD, the removal is detected by a detection means, which may typically include one or more RFID transceivers, such as RFID transceiver 3. RFID transceiver 3 is depicted as mounted to inventory store 1; however one or more RFID transceivers may be installed anywhere, such as transceiver 20 or transceiver/repeaters 23a and 23n, limited essentially by the ability of any particular transceiver and an RFID tag's ability to communicate with the transceiver. For example, inventory store 1 may be installed in a hotel bathroom; while a RFID transceiver/repeater is located in an adjacent room to meet the objects of the invention herein.

For non-limiting purposes of explanation, processor 13 will be discussed as it relates to a microprocessor implementing computer. Drawing attention to FIG. 3a and FIG. 3b, processor 13 having code operable by the processor 13 has the ability to transmit and receive information through one or more input/output (I/O) ports operating under a communication protocol to and from a transmit/receive (T/R) transceiver 3 device, transceiver 20, transceiver/repeater 23a device, and transceiver/repeater 23n device. Transceiver 3 and all other transceivers used herein may take the form of a conventional RFID transceiver. Transceiver 3 may periodically interrogate the RFID tags within its transmission and reception range. The periodic transmissions permit processor 13, and associated software and/or firmware, to ascertain the state of the current inventory within the transmission and reception range of transceiver 3 or any other transceivers reception range transmitting/receiving information to processor 13.

According to an aspect of the present invention, when a sundry, such as product package 14, is removed from the inventory store 1, and not replaced within a predetermined period of time, as determined by processor 13 through periodic interrogations using transceiver 3, then processor 13 having code operable by the processor 13 communicates signals to one or more systems such as inventory management system 15 and/or central processing system 11 (which may include a billing system), hotel desk monitor 19, and point of sale and market research system 11a to reflect consumption of the corresponding item or to permit the administration of the system to take appropriate action.

According to an aspect of the present invention, a first communication from processor 13 sends information related to the removal, or determination of product usage via RF interrogation or replacement of an item into the inventory store sundry cabinet 1 to one or more systems such as inventory management system 15 and/or central processing system 11 (which may include a billing system), and point of sale and market research system 11a, front hotel desk monitor 19 and portable computing device 7 through a transmission channel, such as a WIFI transceiver, a Blue Tooth transceiver, a telephone line, a DSL telephone line, or a high speed digital network, all by way of non-limiting example. In a simplified form, one or more messages indicative of the changed product state may be communicated and recorded. In other forms, central processing system 11 (which may include a billing system) may electronically process the received information to automatically update billing and/or inventory databases in a conventional manner.

According to an aspect of the present invention, a second communication from processor 13 sends information to the portable computing device 7, that may, for example, take the form of a personal digital assistant (PDA), such as a handheld Palm or similar device operated by a staff servicing the room from which the transmission emanates. This signal is received outside a guest's door, allowing staff, such as a maid, to check the bathroom sundry cabinet 1, a room closet, the room itself, or mini-bar without having to knock or open the door to the room. Such staff now has an immediate and current record of the inventory change. It is recognized that the central processor 11 or inventory management system 15 rather than processor 13 may in an alternate embodiment send inventory information directly to the portable computing device 7, after central processor 11 or inventory management system 15 are updated via processor 13.

It is apparent that more than one sundry may be removed from the inventory store at any given time. Nevertheless the system 300 continues to keep track of all existing non-used products utilizing techniques and methods well known to those skilled in the art of RFID technology. For example, many RFID systems employ an Aloha protocol as an anti-collision mechanism, which serves as but one type of protocol that the present invention may employ. The Aloha protocol sorts through a population of RFID tags and assigns each a node address. Transceiver 3 sends out a request command to all tags in its range. The tags respond by selecting a random number. This random number becomes the tag's slot number. The transceiver 3 then polls the tags in its range for slot number zero (0). All tags that have chosen a random number of zero (0) respond. If exactly one tag responds, then the transceiver 3 assigns a unique node address to the tag. If more than one tag responds, the transceiver 3 ignores the response. The polling proceeds with the transceiver 3 polling for the next slot number. Upon reaching the end of the polling sequence, the transceiver 3 starts again by requesting tags that have not been assigned a node address to select a new random number. This process continues until all tags in range have been assigned unique node addresses. At this time communication with individual tags occurs without a collision threat. In the present invention, the transceiver 3 establishes and stores a sundry article's tag slot number as it is initially inventoried in the inventory store 1. Thereafter, when the article is removed from the inventory store 1, the transceiver again stores an article's identification and thereafter need only scan for the articles that have left the inventory store 1 and that do not have a definite disposition, as for example determined to be used.

According to an aspect of the present invention, using a product disables an associated RFID tag, such that the package cannot be reused, as in some instances to "fool" the system that an item is being returned for credit. Commercially available RFID tags are measured at 0.4 mm×0.4 mm, and are thinner than a sheet of paper. Accordingly, such RFID tags are practically invisible. However, these tags may prove difficult to destroy. According to an aspect of the present invention and by way of non-limiting example, the RFID tag may be manufactured with a printing process that serves to create the antennae. One method of disabling the tag is to destroy the effectiveness of the antenna.

According to another aspect, an RFID tag is utilized on item packaging to track items for sale, and is adapted to be destroyed, i.e., have the responsiveness to RF interrogation signaling disabled, when a transceiver interrogates the item. Destroying the tag occurs upon opening the package of a purchased item. When the transceiver does not get a transmitted response from the RFID tag as a result of interrogation within its range, it sends a signal to processor 13 that the item no longer exists within that range. Processor 13 then determines from the data retrieved from other transceivers associated with it that the item no longer exists in the entire predetermined range and has been consumed. This prevents an item being placed back into the housing facility and being incorrectly accounted for as usable/billable. As illustrated in FIG. 2a, according to an aspect of the present invention, the RFID tag 16 and associated functional antenna 18a. When the package is opened the antenna is severed as shown with reference to antenna portion 18b. In FIG. 2b opening package 14 exposes as for example product 19. In opening the package 14 the RFID tag 16 antenna is severed as shown with reference to antenna portion 18b. Alternatively, where the antenna is printed, the antenna may be disconnected from the RFID tag body when the package is twisted or torn open to retrieve the contents.

According to another aspect of the invention, the sundry inventory store 1 may include a Faraday shield so as to electromagnetically insulate items therein from external electronic radiation utilized in interrogating the room. More particularly, according to an aspect of the present invention, upon a product being removed from the inventory store cabinet 1, an RFID tag affixed to the sundry may be interrogated by a transceiver 3 to collect data useful for verifying what is entering and leaving the cabinet 1 inventory store. The collected data is typically provided to processor 13. When the product leaves cabinet 1 transceiver 3 detects the event and updates processor 13. If the product is returned to the sundry cabinet 1, it again passes through the interrogation field of transceiver 3 (e.g., a gateway interrogator). The reception of an RFID response is provided to processor 13. If the attached RFID tag is determined by the management system to have previously become non-responsive to interrogation by for example transceiver 20, processor 13 management system concludes the corresponding product was consumed. Transceiver 3 and transceiver 20 interrogation may be performed at a periodic rate depending on a design choice as for example, every 1, 2, 5, 10, 15, 20 or 30 seconds, all by way of non-limiting example, so that any change occurring within that interval is noted as either a selection or a return. Of course, faster or slower rates may also be used. In the event that the item is returned to the sundry container in an unopened condition, the inventory can be reversed.

As illustrated in FIG. 3a, according to an aspect of the present invention, semi-passive RFID tag 16 incorporates no power source, however a power source such as a battery, may be used. A battery would allow the tag integrated circuit to be constantly powered. In such an embodiment, the antenna 18a would not need to collect power from the incoming signal. Antenna 18a could therefore be optimized for backscatter signaling. Further, semi-passive RFID tags are generally faster in response and therefore stronger in reading ratio compared to passive tags. By way of non-limiting example, as with the passive RFID tags, semi-passive RFID tags may be manufactured using a printing process that creates the antenna. Using a semi-passive RFID tag may facilitate detection by remote RFID interrogators positioned remote from inventory store 1.

As illustrated in FIG. 3a, the transceiver 3 is focused across the inventory store 1 opening to operate as a security gate to detect whether a sundry has been removed from and/or placed into the sundry container. Optionally, one or more directional antenna can be used for interrogation signaling to mitigate potential cross-talk from products having RFID tags inside the inventory store 1. Alternatively, transceiver 3 generally interrogates inventory store 1 and collision avoidance may be used. In either event, if a user returns the sundry, the item is recorded as being present (e.g., a register may be incremented, a flag set or a bit set) and the inventory updated. More particularly, the transceiver 3 comprises a transceiver and a decoder, and emits a signal activating through its antenna (not shown) the RFID tag 16 so as the tag is read and/or transmits data to the transceiver 3. In this manner, the inventory is created and recorded when an RFID tag passes in the direction BA through the electromagnetic RF interrogation field associated with a transceiver 3. Essentially, a removed product status is determined from the inventory established when the product is initially placed in cabinet 1. In the illustration the RFID tag 16 detects the transceiver 3 activation signal and the RFID tag 16 responds by transmitting a code encoded in the tag's integrated circuit (silicon chip) indicative of what it is (e.g. "SKU"). The transceiver 3 reads the data and the data is passed through processor 13 and then to the host computer 11. Likewise, when the RFID tag 16 passes in the direction AB through the electromagnetic RF interrogation field associated with a transceiver 3 the processor 13 and/or central processor flags the event signifying that a product such as sundry 14 has been removed. A removed product status is determined from the inventory established when the product was initially placed in cabinet 1. Whether the data is processed at the transceiver 3 or processor 13 or central processor 11 is a design choice. The application software typically used in this process often employs Physical Markup Language (PML). PML is a markup language based on XML for communicating a description of physical environments and the objects within them, their relationships to the user of the product associated with an RFID tag, and the space where the product may be contained.

Figure 3B:
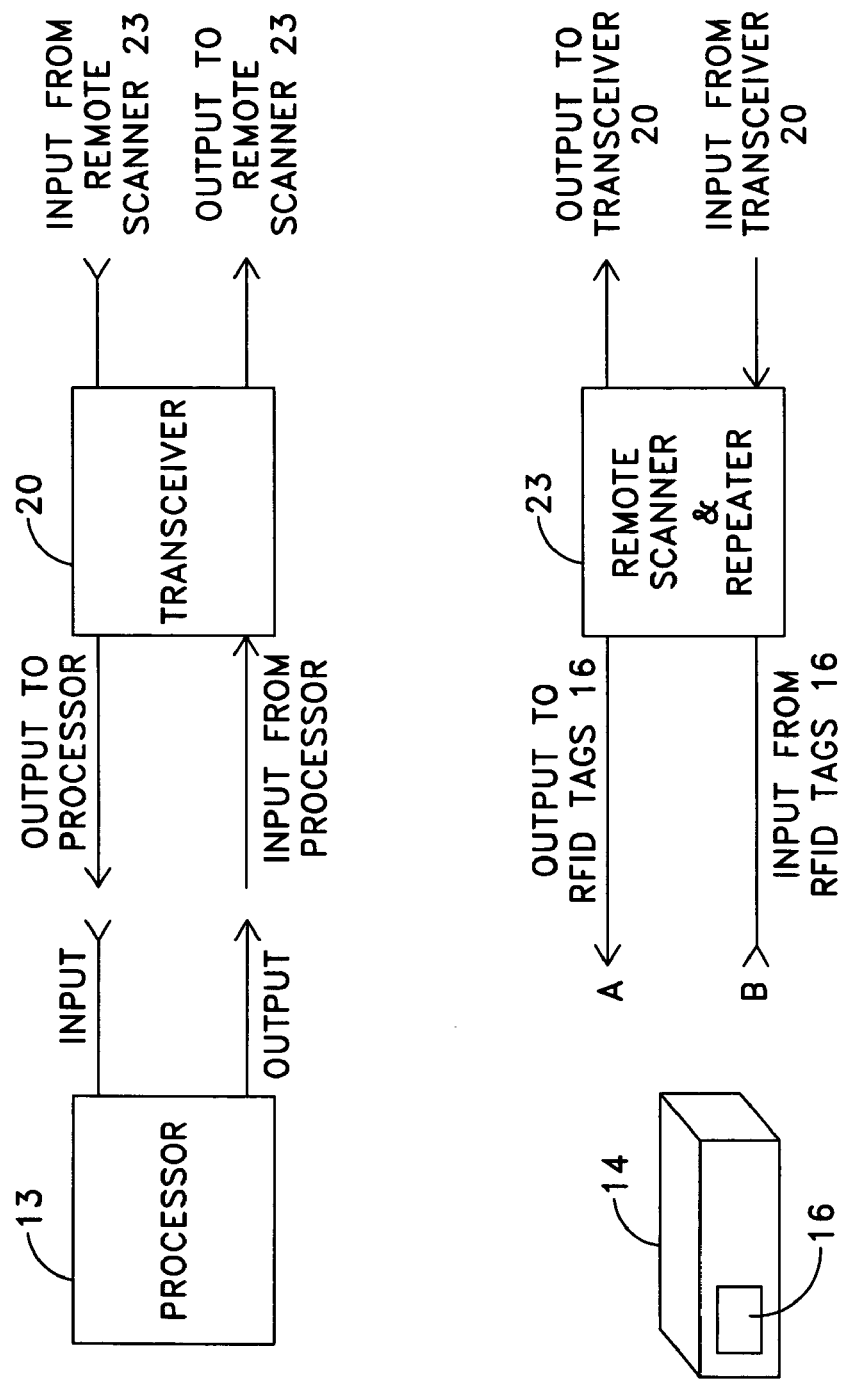
FIG. 3b illustrates a system for dispensing and inventorying in accordance with an aspect of the present invention.

Although RFID tags are usually intended for short-distance use, they can be interrogated from greater distances utilizing a high-gain antenna or utilizing additional scanners that transmit and receive RFID tag input data and retransmit the data to a remote receiver, allowing the contents of a room to be scanned for RFID packaged goods anywhere in a room or suite of rooms. As shown in FIG. 3a and FIG. 3b, when long distances between the transceiver 3 and the package such as package 14 cause a deterioration in RFID tag return signals the system 300 may incorporate one or more transceiver/repeater combinations $23_a$-$23_n$. Transceiver 20 may have a direct connection or a radio connection to communicate with processor 13. Likewise transceiver 20 may have a direct connection or a radio connection to communicate with the one or more repeaters $23_a$-$23_n$. In alternate configuration repeaters $23_a$-$23_n$ may have a direct connection or a radio connection to communicate with processor 13. Each of these alternative communication modes are design choices.

In one embodiment of the present invention as shown in FIG. 3b, the processor 13 sends a signal to the transceiver 20. Transceiver 20 transmits and receives data communication from a remote transceiver/repeater, such as one or more of the repeaters $23_1$-$23_n$ to interrogate products, such as sundry package 14 that has been removed from the cabinet 1. One remote transceiver/repeater $23_1$ is configured to scan the field where the product such as sundry package 14 may be situated, such as within a FIELD or room as shown in FIG. 3a. When the transceiver 23 receives its RFID input it transmits the data to the transceiver 20 and transceiver 20 communicates the data to processor 13.

Optionally, and particularly useful for individuals that may have a visual impairment, when an item is removed from the inventory store 1, and the attached RFID tag is identified, such as by processor 13, a conventional speech generator and speaker included in a computing device 17 (FIG. 3a) internal or external to inventory store 1, may be used to provide an audible indication that identifies the product, such as: the sundry name, use instructions and product use warnings.

Optionally, device 17 also provides for video capability, such as by incorporating a liquid crystal display or technological equivalence ("LCD") having corresponding menu screens. When processor 13 identifies a removed item, one or more targeted promotional opportunities may be identified and corresponding offers presented on the LCD. For example, "buy 2 get 1 free" offers may be presented by removing a single sundry. Optionally, a point of sale system 11a may send audio and/video content to the device 17 for targeted advertising (e.g., commercial for new razor in the box, location of nearest hairdresser or barber, masseuse, gym, doctor, tailor etc.) from a programmed schedule. Optionally, a user input, such as via a touch-screen or separate buttons can be used by a guest to confirm purchases (Yes or No questions) which input to processor 13 and communicated to point of sale system 11a for further interaction with the consumer.

According to an aspect of the present invention, a UPC reader 21 may be used in combination with, or in lieu of, one or more of the RFID transceivers. Such a UPC scanner 21 may be positioned in any convenient location on the cabinet 1 and made available to the guest to "self purchase" items. A guest chooses an item and then scans the UPC tag that has been outfitted previously on the item with the miniature UPC laser scanner mounted on the sundry container. A method of multiple scans or LCD touch sensitive technology may be used to confirm purchases. Again this information may be provided to processor 13.

In one embodiment the present invention when an item is selected and pulled out for usage and is not replaced within a certain time period, such as by way of example, one (1) hour, a timer implemented in hardware, firmware or software located in the processor 13 or central processor 11 indicates that item has been selected and removed by a customer or patron and further that the customer is to be charged for the use. In this embodiment the inventory is decremented.

Different products or sundries typically require packaging suited for their intended purpose and may require particular transceivers. Since product packaging differs depending on the item for sale or use, different inventive solutions to provide an inventory system that records when a product has been used, opened, consumed or removed from the room. In another embodiment of the present invention an associated pair of RFID tags are installed on a product package. Having a pair of RFID tags permits at least four (4) different states of the pair to be interrogated. For example, tag W and tag X are both functioning, or tag W is functioning and tag X is not functioning or tag W is not functioning and tag X is functioning tag or finally neither W is functioning nor tag X is functioning. These combinations prove useful in determining whether certain in-room convenience items are first utilized and then whether the items are removed from the room. As for example, if a bathrobe has contained thereon two RFID tags W and X and only W must be destroyed to use the bathrobe, but X need not be. After the robe were used interrogating the tags W, X will disclose that the bathrobe was used but not removed from the room. If subsequently the bathrobe were to be removed from the room and not returned within a given period of time as established in the processor 13 e.g., the front desk interrogates processor 13 when a guest checks out, then the absence of a signal from tag X would indicate that the robe was permanently removed from the room, for which the customer would be billed.

In yet another non-limiting example, the transceiver 3 detects the reception of two associated RFID tags at two different intervals of time. When the system 300 transceiver 3 interrogates the field it associates a paired set of RFID tags having an equivalent or approximately equivalent displacement determined from the time of interrogation of each until the time of reception at the transceiver source. The transceiver 3 or processor 13 logs the nearly identical response times as emanating from the same product package. Upon opening of the package one of the pair of RFID tags is destroyed, however the second RFID tag remains in tact. When system interrogates the field, it only receives one of the two previously recorded pairs and detects the difference as indicating that a package has been opened.

In yet another non-limiting example tracking inventory may be effectuated when the one or more articles have been used if two or more transceivers (additional transceivers would provide for an exact location) determine that an associated pair of radio frequency identification devices installed on an article produce receptions from different locations. The transceiver 20 and 23 or any other pair of transceivers as might be employed, may each independently detect the reception of two associated RFID tags at two different intervals of time, which can each be related to differences in location within the field. When the system 300 transceiver interrogates the field it associates a paired set of RFID tags having an equivalent or approximately equivalent displacement. However, when the paired set of RFID tags do not have an equivalent or approximately equivalent displacement in any RF interrogation other than the initial scan, this would indicate the paired set of RFID tags have been moved away from each other. This would occur if one of the tags were attached to the main body of an item e.g., a bottle, and the other tag in the pair were attached to a bottle top or cap. This would indicate the item was opened or used.

Figure 4A:
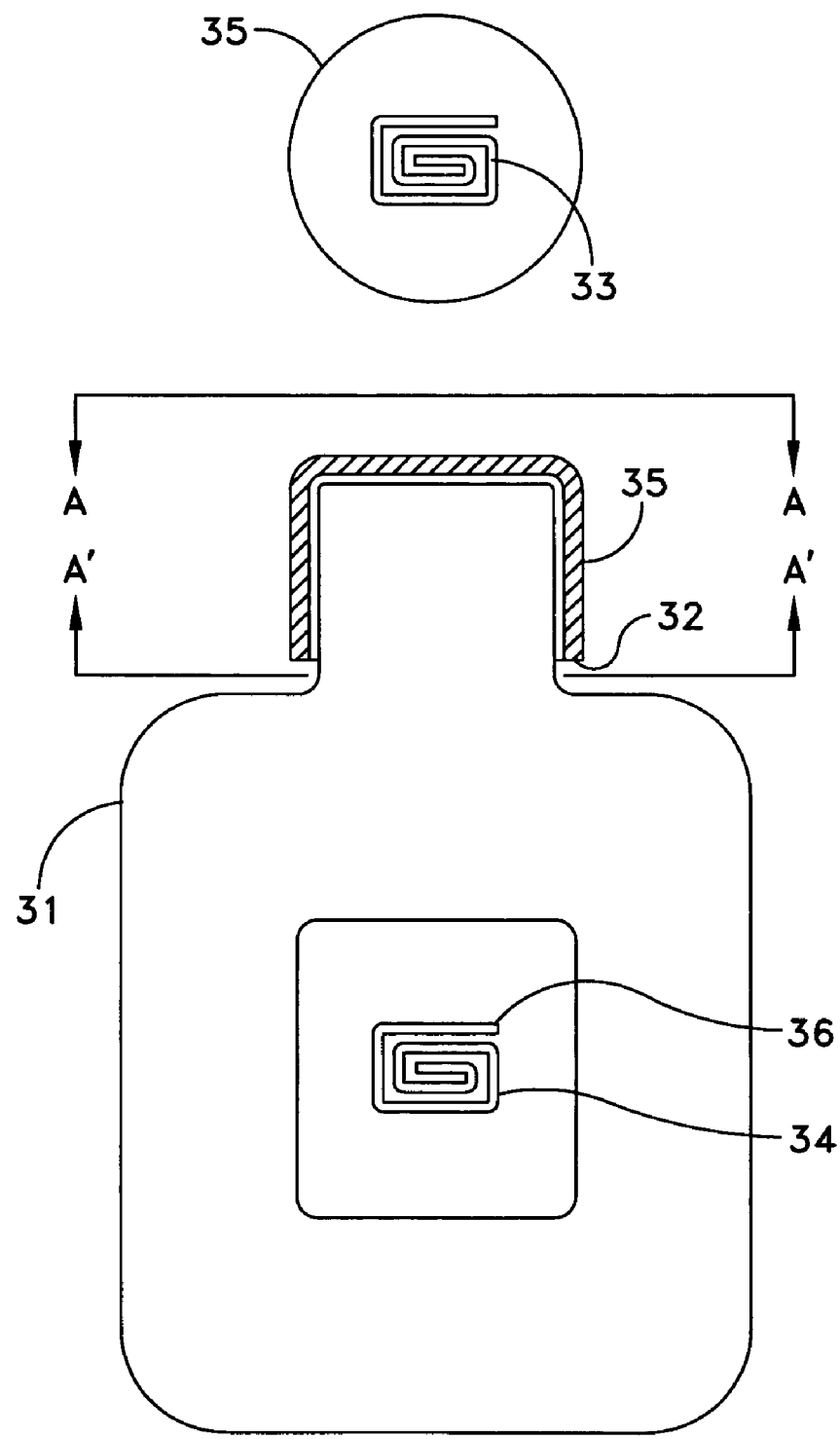
FIG. 4a illustrates a product package in accordance with an aspect of the present invention.

In yet another embodiment of the present invention an associated pair of RFID tags are installed into a product package. In FIG. 4*a* a product package in accordance with an aspect of the present invention includes a container 31 having a cap 35. Mounted integral to the cap 35 is an RFID device 33. The RFID device 33 includes an antenna 32. The RFID device 33 also may be molded into or bonded to the cap in any location using fusing, glue or other suitable means known to those skilled in the art of plastic manufacture or bonding materials. A second RFID device 34 is mounted integral to the container 31 using techniques such as molding or bonding to the container in any location using fusing, gluing or other suitable means known to those skilled in the art of plastic manufacture or bonding materials. The RFID device 34 includes an antenna 36. Before the 35 cap is separated from the container 31, the system 300 interrogates the field containing the container 31 and associates the pair of associated RFID tags 34,33 as having equivalent or approximately equivalent displacements from the reader source and logs the nearly identical response times received as emanating from the same product package, container 31, in this example. Upon opening of the package the pair of RFID tags 34,35 are separated and therefore displaced having been attached to different parts of the package, such as by cap 35 having been removed and displaced from its container 31. In this embodiment both RFID tags 34,35 remain in tact. When system interrogates the field, it receives the two previously recorded pairs and detects the time displacement difference as indicating that a package has been opened.

Figure 4B:
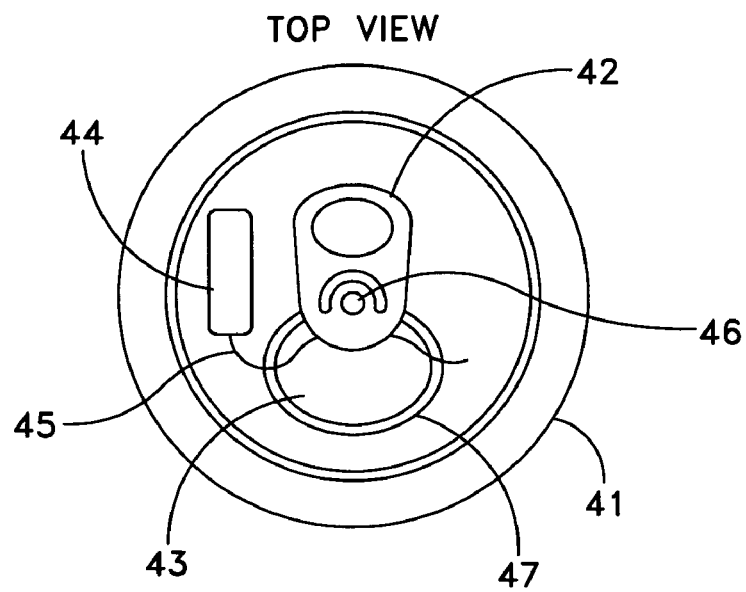
FIG. 4b illustrates a product package in accordance with an aspect of the present invention.
Figure 4B:
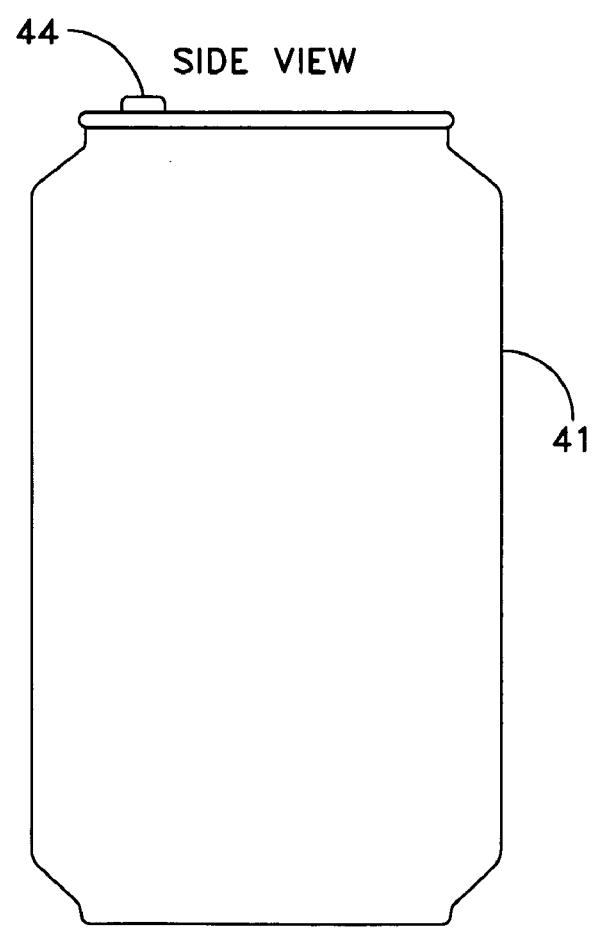

FIG. 4*b* illustrates a product container 41 popular in dispensing liquid consumable beverages in accordance with an aspect of the present invention. An associated disabling means or a leverage means such as tab 42, as fixed to container 41 through fastening member 46, cooperate with RFID tag 44 which is bonded to the top of container 41 such that a breaking container seal 47 cooperates to sever or disable antenna 45 of the RFID tag 44. Tab 42 through a disabling or leverage force, breaks the seal 47 with the aid of a score 43 to open the container. Integral to the score and/or opening is the RFID tag 44 antenna 45. Upon pulling the tab 42, the container 41 score 43 gives way and the RFID tag 44 antenna 45 is severed disabling the RFID tag 44 thereby indicating that the product container has been opened.

Figure 4C:
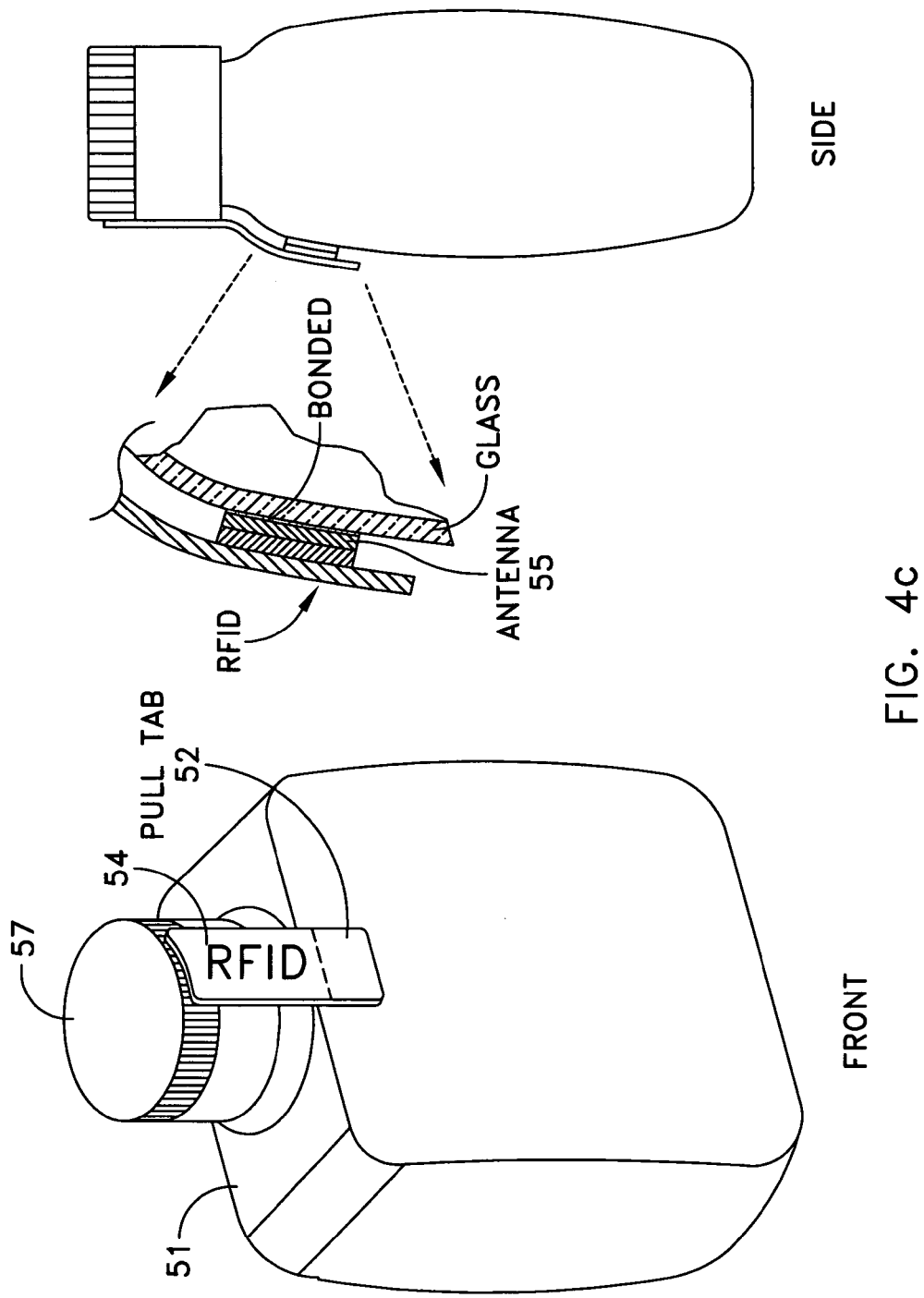
FIG. 4c illustrates a product package in accordance with an aspect of the present invention.

In yet another embodiment of the present invention is a container comprising a cap, a body and a tab, wherein an associated antenna is connected to the tab and the body of the container and which when the tab is removed severs the antenna. More particularly, FIG. 4*c* illustrates a product container 51 suitable for dispensing liquids in accordance with an aspect of the present invention where an RFID tag 54 and an associated antenna 55 are attached via an adhesive bond to the body of the container 51. The RFID tag 54 is also bonded to the cap 57. Integral to the tab 52 is the RFID tag 54 having an associated antenna (not shown). When the tab 52 is pulled, it forces the antenna to be severed from the RFID tag 54 thereby disabling the RFID tag and indicates the product container 51 has been opened.

Figure 4D:
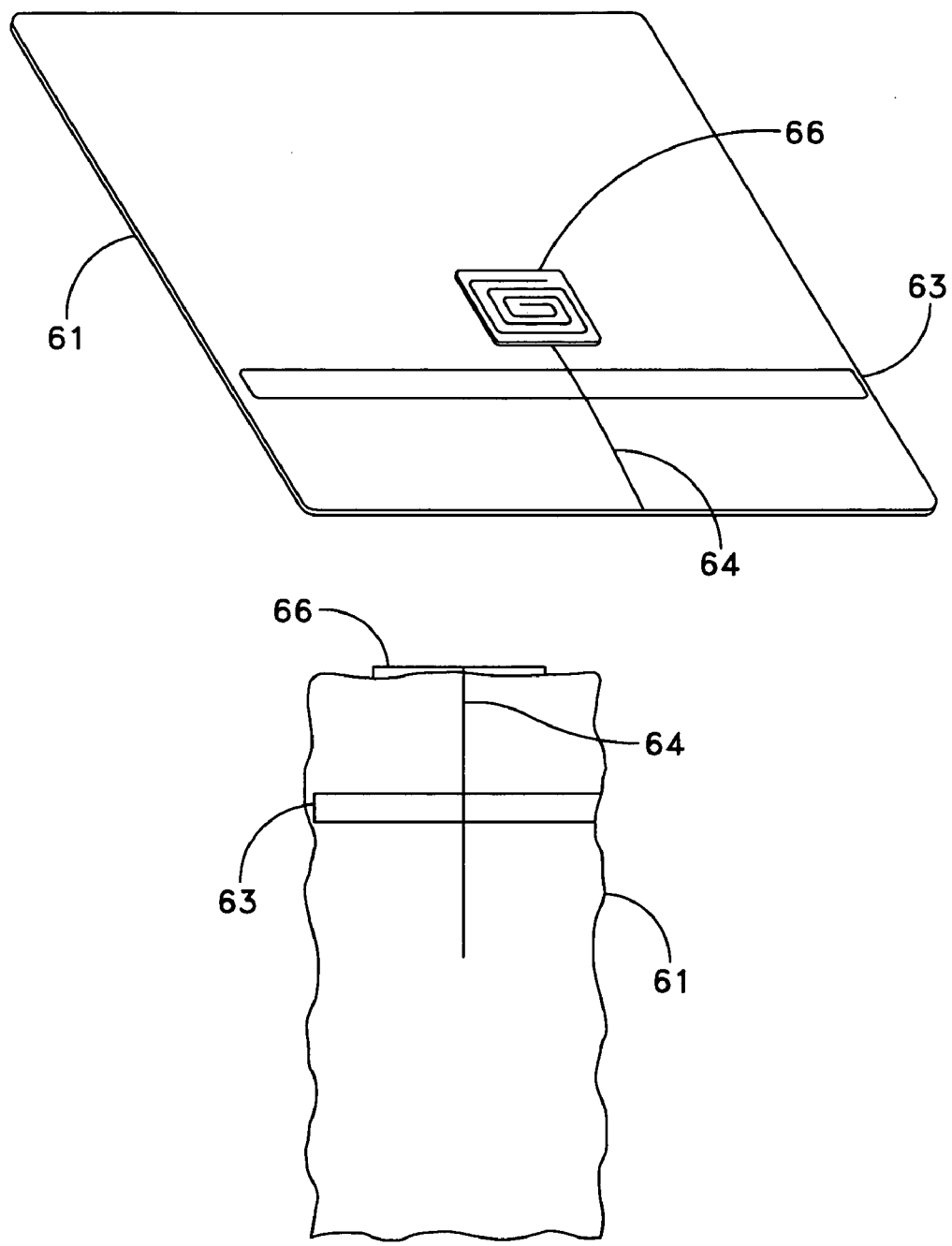
FIG. 4d illustrates a product package in accordance with an aspect of the present invention.

FIG. 4*d* illustrates a product container 61 suitable for dispensing foods in accordance with an aspect of the present invention, where RFID tag 66 and an associated antenna 64 are attached via a thermal, pressure or adhesive bond to the body of the container 61. By way of example and not limitation container 61 may be manufactured from polyvinyl chloride film, super shrink polyolefin film or polypropylene. Integral to the tab 63 is the RFID tag 66 antenna 64, such that when tab 63 is pulled forces the antenna 64 to be severed from the body of RFID tag 66 disabling the RFID tag 66 indicating the product container 61 has been opened.

Figure 4E:
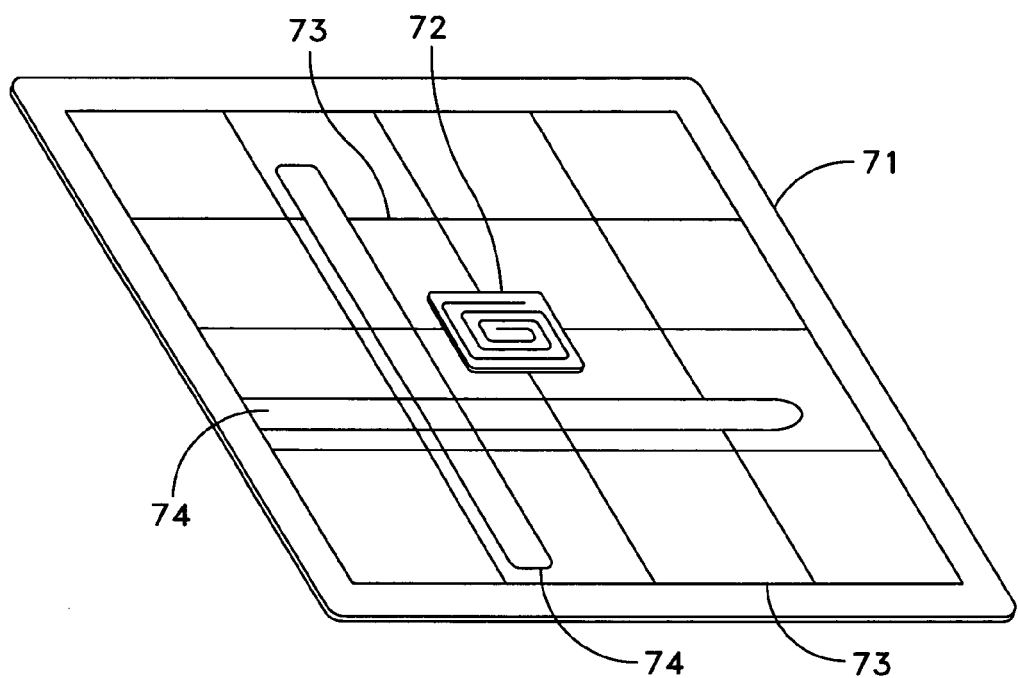
FIG. 4e illustrates a product package in accordance with an aspect of the present invention.

FIG. 4*e* illustrates a product container 71 suitable for dispensing foods in accordance with an aspect of the present invention. An RFID tag 72 and associated grid antenna 73 have a plurality of elemental antenna attached via a thermal, pressure or adhesive bond to the body of container 71. By way of example and not limitation, container 71 may be manufactured from polyvinyl chloride film, super shrink polyolefin film or polypropylene. Integral to one of two tabs 74 is the RFID tag 72 grid antenna 73, which when either of the tabs 74 is pulled it forces at least one element of the grid antenna 73 to be severed from the RFID tag 72 indicating the product container 71 has been opened.

Figure 4F:
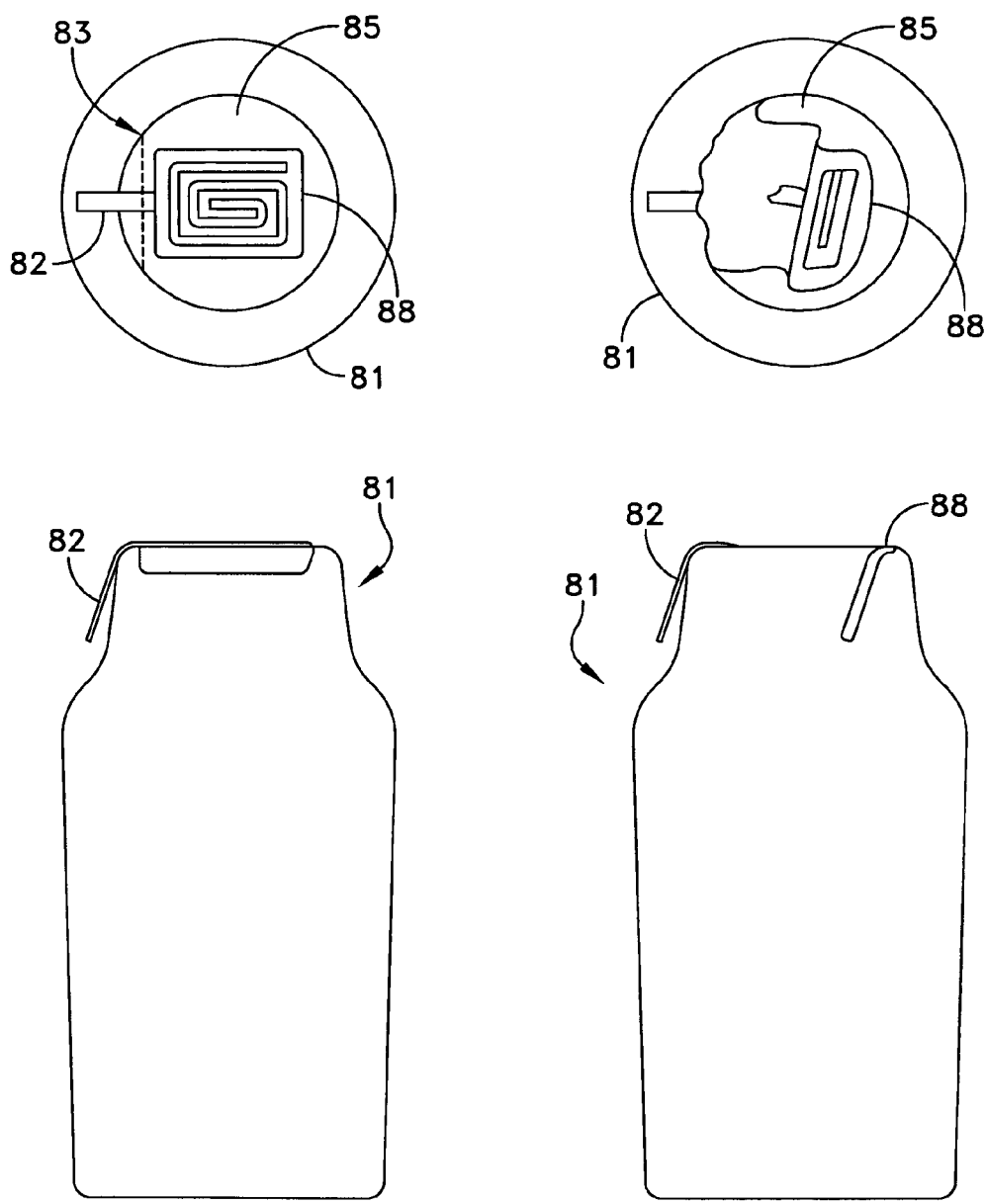
FIG. 4f illustrates a product package in accordance with an aspect of the present invention.

An aspect of the present invention comprises a seal having a disabling means, and radio frequency identification device antenna integral to the seal whereby the disabling means acts upon the seal to disable the antenna. FIG. 4*f* illustrates a product container 81 in accordance with an aspect of the present invention where an RFID tag 88 having an antenna 82 is bonded via a thermal, pressure or adhesive bond to a protective foil seal 85 that is inserted into the top portion of the container 81. By way of example and not limitation, container 81 may, be manufactured from glass, metals or plastic such as polyvinyl chloride, polyolefin or polypropylene. Through the application of downward forces a mechanical advantage means or manufactured weakness, such as perforated area 83 along the periphery of the foil 85, opens the container 81. Integral to the foil 85 and/or opening is the RFID tag 88 and associated antenna 82. Upon pushing perforated area 83, the container 81 foil 85 gives way and the RFID tag 88 antenna 83 is disabled.

Figure 4G:
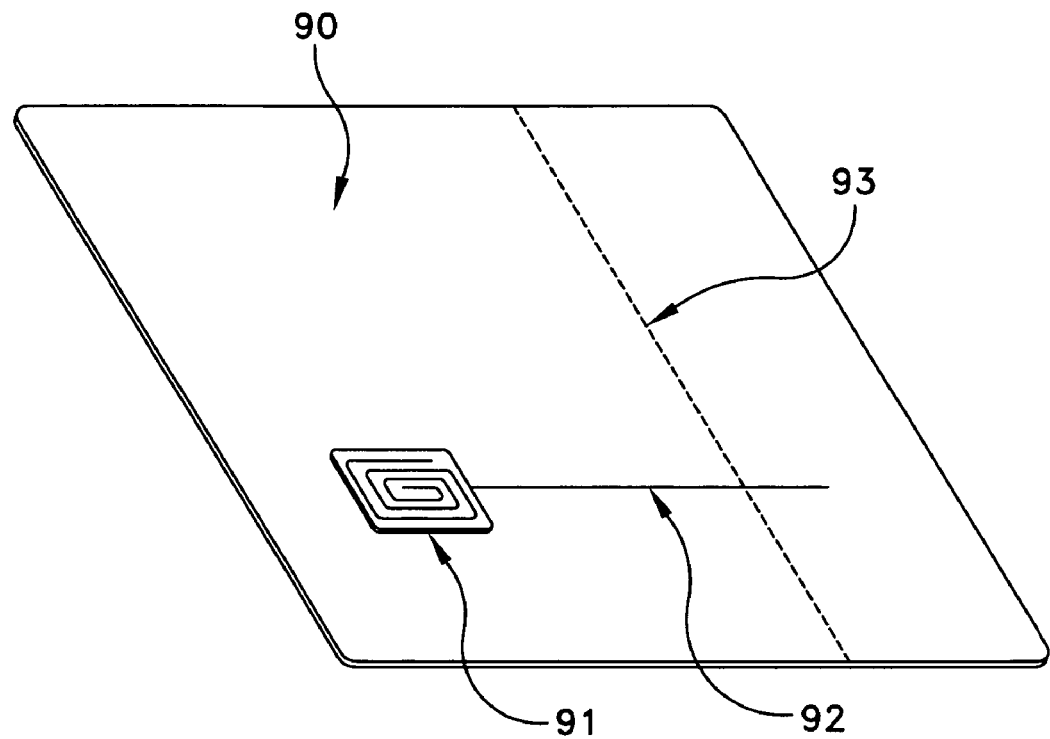
FIG. 4g illustrates a product package in accordance with an aspect of the present invention.
Figure 4G:
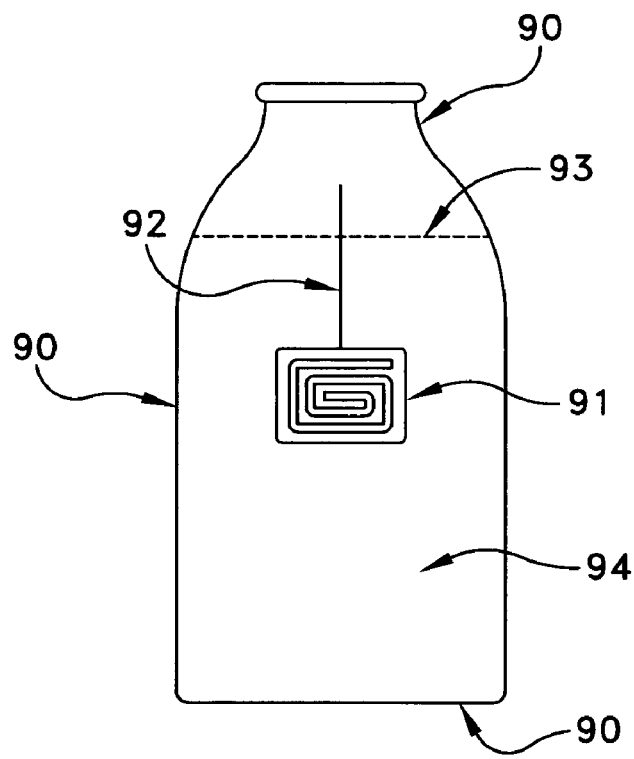

In yet another embodiment of the present invention is an RFID tag bonded to a polyvinyl chloride film, super shrink polyolefin film, polyproplene or any other alternative shrinkable material useful in the process of wrapping product. FIG. 4*g* illustrates a full body shrink label 90 with an attached or bonded RFID tag 91, antenna 92 that spans a perforation and/or pull tab 93. After full body shrink label 90 is applied to a product, such as by way of illustration container 94, the perforation and/or tab 93 is utilized in accessing container 94. When the perforation and/or tag 93 is torn to access container 94, antenna 92 is destroyed thereby disabling RFID tag 91 indicating the product has been used or accessed.

Figure 4H:
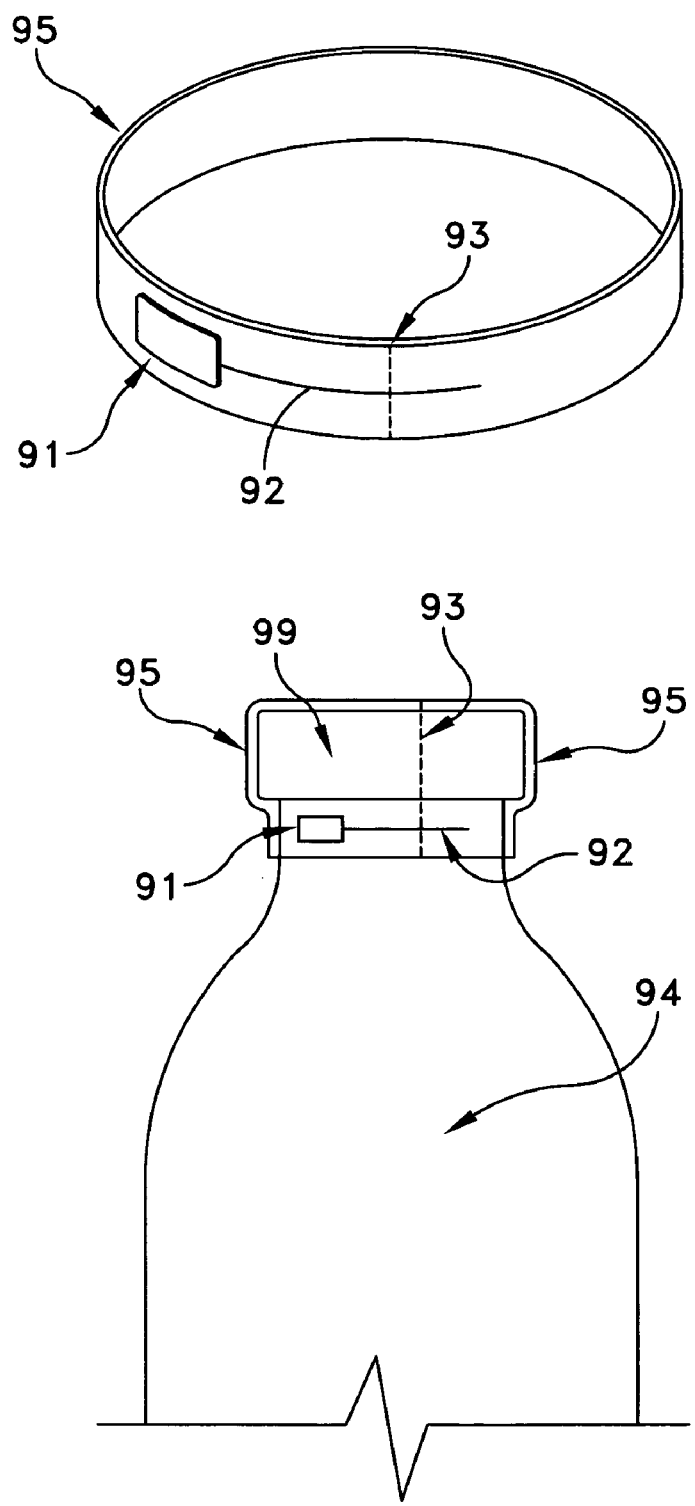
FIG. 4h illustrates a product package in accordance with an aspect of the present invention.

In yet another embodiment of the present invention an RFID tag by way of example and not limitation is bonded via thermal, mechanical pressure or adhesive to a seal such as band 95, which may be manufactured from polyvinyl chloride film, super shrink polyolefin film or polypropylene, all useful in the process of sealing a product. Such bands are useful in protecting the integrity of the contents of the container. FIG. 4h illustrates a seal in the form of a shrink band 95 with an attached or bonded RFID tag 91. The RFID tag 91 antenna 92 is integral to the seal whereby a perforation or pull tab 93 of the band 95 provides the disabling means to act upon the seal and to disable the antenna. Antenna 92 of tag 91 spans a perforation or pull tab 93 of the band 95. After the shrink band 95 is applied around a product 94 top or cap 99, the perforation and/or pull tab 93 may be utilized to access container 94. In this accessing process, antenna 93 is destroyed thereby disabling RFID tag 91 indicating the product in container 94 has been used or accessed.

Figure 4I:
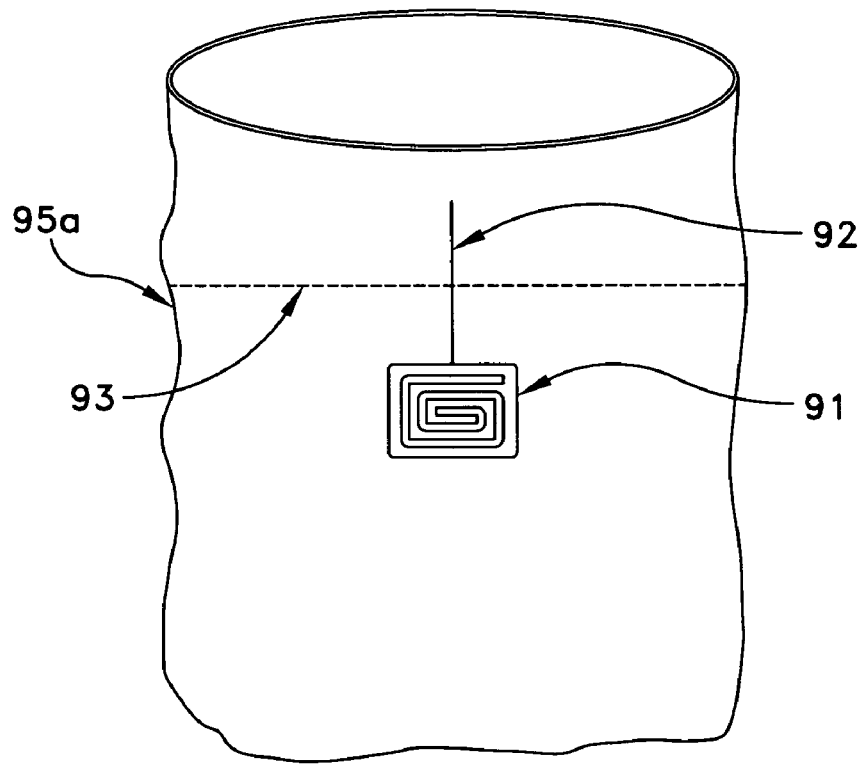
FIG. 4i illustrates a product package in accordance with an aspect of the present invention.
Figure 4I:
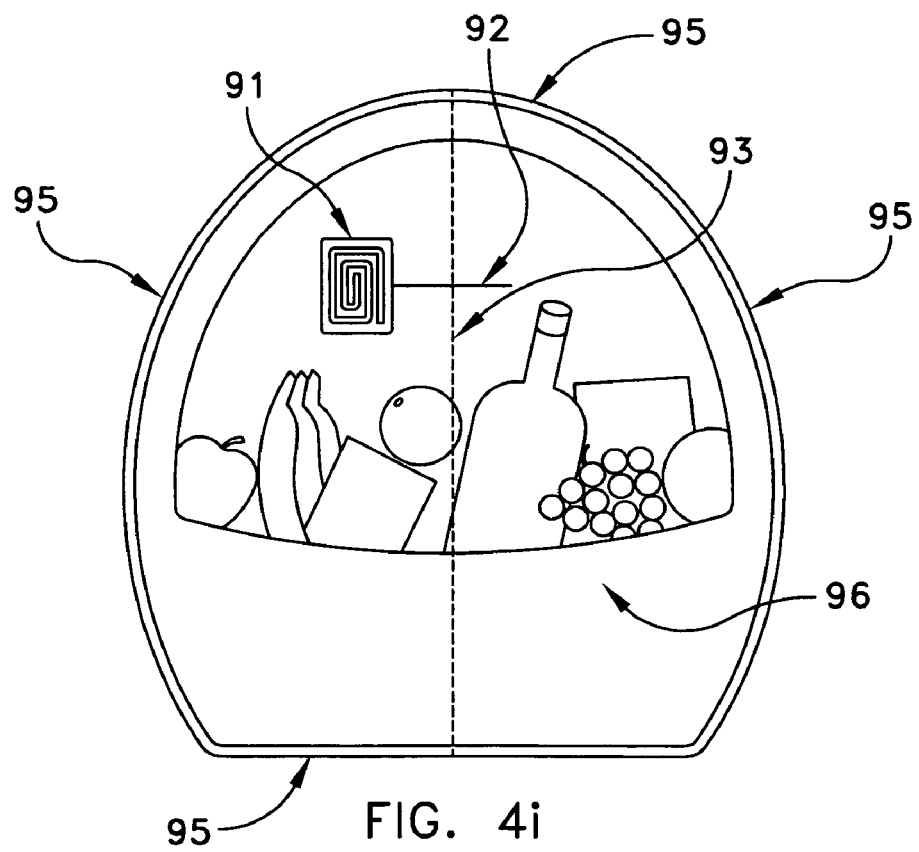

In yet another embodiment of the present invention an RFID tag bonded to a shrinkable material as previously mentioned useful for wrapping a product. FIG. 4i illustrates a shrink bag 95a with an attached or bonded RFID tag 91, and antenna 92 that spans a perforation and/or established pull tab 93. After the shrink bag 95a is applied around product 96, the perforation and/or tab 93 is utilized in accessing product 96. In this accessing process, antenna 92 is destroyed disabling RFID tag 91 indicating the product 96 has been used or accessed.

Figure 4J:
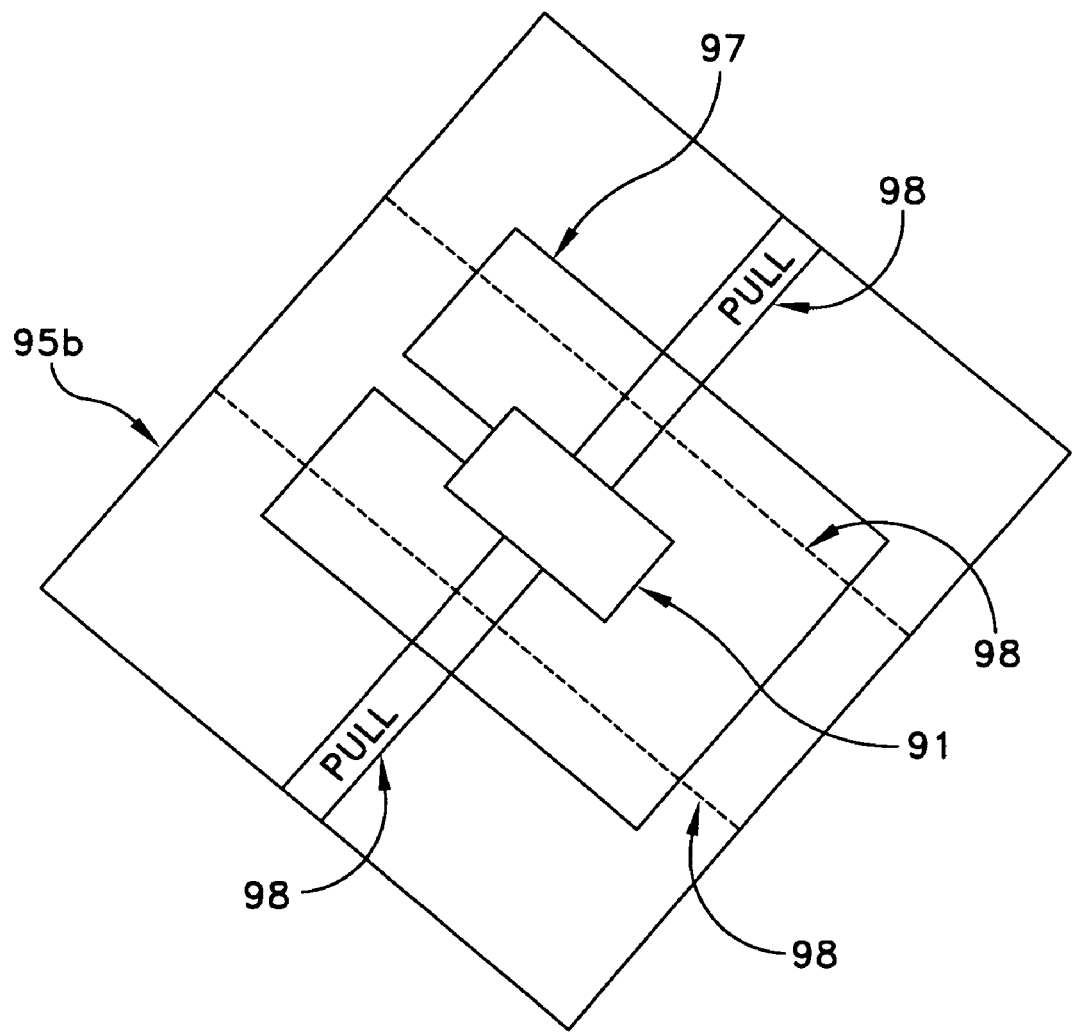
FIG. 4j illustrates a product package in accordance with an aspect of the present invention.

FIG. 4j illustrates a shrinkable bag 95b with an attached or bonded as previously mentioned RFID tag 91 and an associated grid antenna 97 having a plurality of elemental antenna that span perforations and/or tab 98. When either of the perforations and/or tabs 98 is pulled, it forces at least one element of the grid antenna 97 to be dysfunctional from the RFID tag 91 indicating the product has been used or accessed.

Figure 4K:
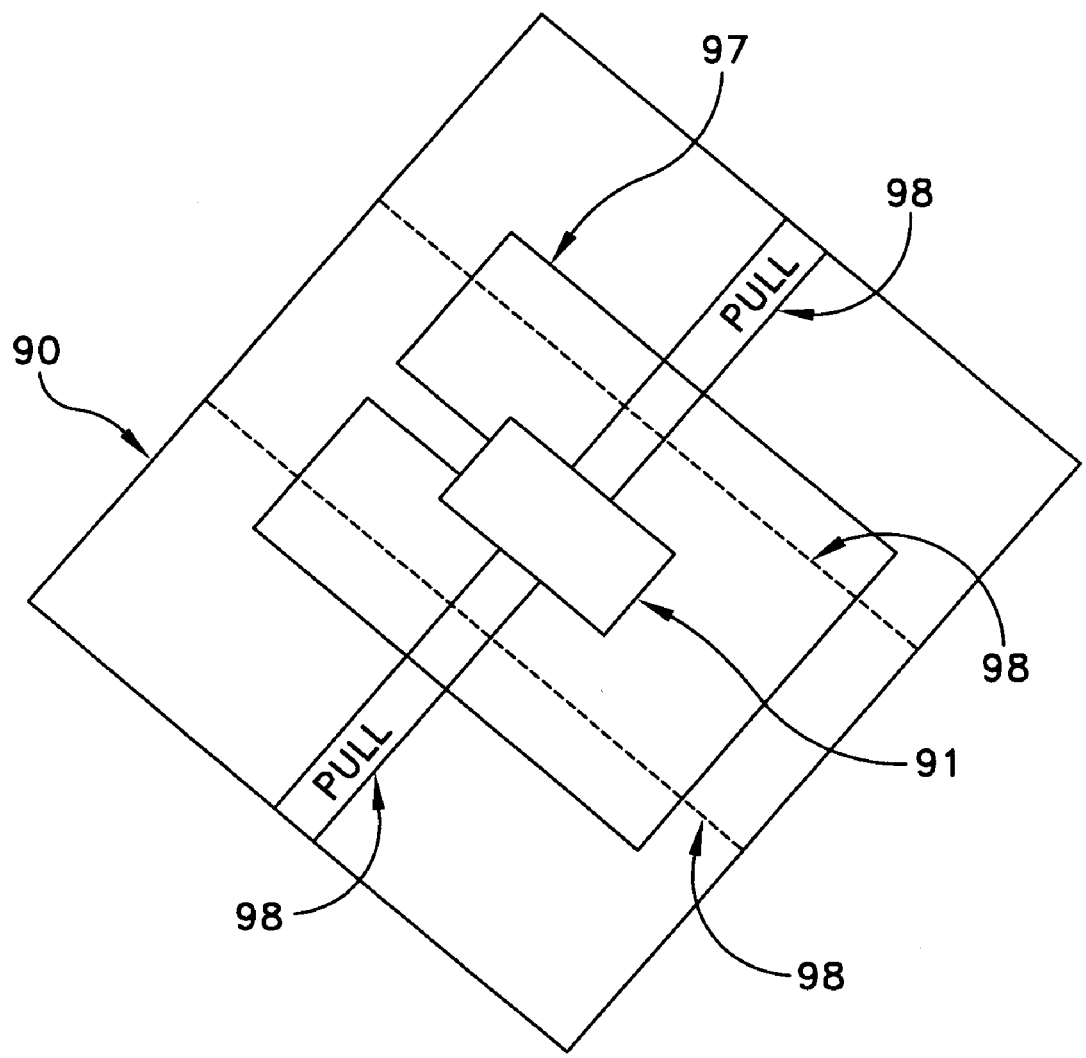
FIG. 4k illustrates a product package in accordance with an aspect of the present invention.

FIG. 4k illustrates by way of example and not limitation, a full body shrink label 90 with an attached or bonded RFID tag 91 and an associated grid antenna 97 have a plurality of elemental antenna that spans all perforations and/or tab 98. The RFID tag 91 by way of example and not limitation is bonded via thermal, mechanical pressure or adhesive to the label such as a shrink label, which may be manufactured from polyvinyl chloride film, super shrink polyolefin film or polypropylene, all useful in the process of labeling a product. Other labels may be manufactured from paper or other well-known materials utilized in the manufacture of labels. When either of the perforations and/or tabs 98 is pulled it forces at least one element of the grid antenna 97 to be severed from the RFID tag 91 indicating the product has been used or accessed.

By way of non limiting example, the antenna for the illustrated RFID tags can be applied to the shrinkable material useful for wrapping a product with the same rotogravure and/or flexography printing technique (in this case with metal infused inks) utilized for Universal Product Codes or non or high gloss printed labels.

Those skilled in the art of computer programming will appreciate that the invention may be implemented in a system of computer units communicatively coupled to one another over a network, such as a wide area network, local area network or the global interconnection of computers and computer networks commonly referred to as the Internet. Such a network may typically include one or more microprocessor based computing devices, such as personal computers. "Personal computer", as referred to herein, general refers to a general purpose computing device that includes a processor. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory may be internal or external to an integrated unit including a personal computer. Memory preferably stores a computer program, e.g., sequence of instructions being operable by a processor.

By way of further non-limiting example, in a distributed implementation, the system may typically include a local area network (LAN) of terminals or workstations (e.g., PCs), telephone interfaces, database file servers, input devices and output devices configured by software for accumulating, processing, administering and analyzing attributes in an automated workflow environment. "Server", as used herein, generally refers to a computer or device communicatively coupled to a network that manages network resources. For example, a file server is a computer and storage device dedicated to storing files, while a database server is a computer system that processes database queries. A server may refer to a discrete computing device, or may refer to the program that is managing resources rather than an entire computer.

Figure 5:
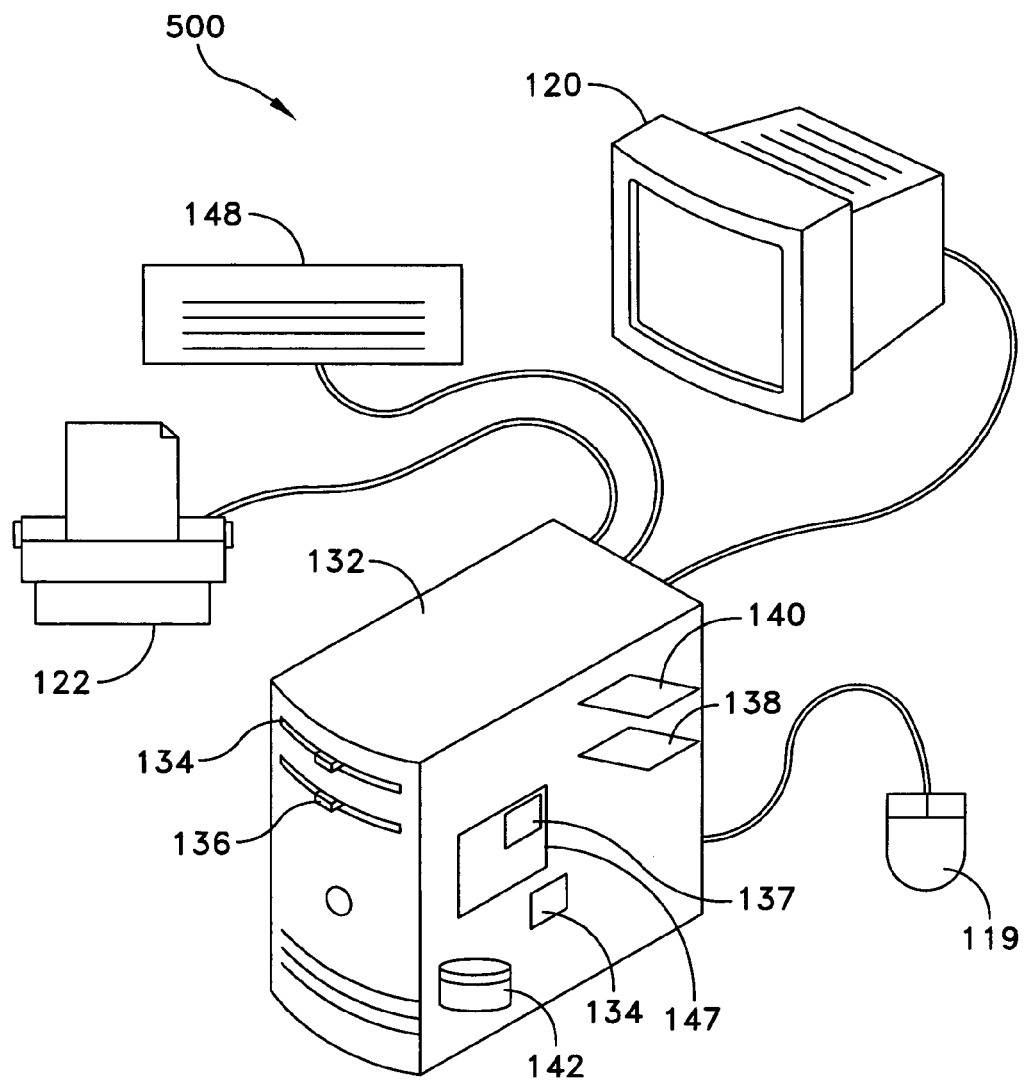
FIG. 5 illustrates a computer system for inventory control in accordance with an aspect of the present invention.

By way of further, non-limiting example, FIG. 5 system 500 generally includes one or more computers 132, including a CPU 147 having an arithmetic logic unit (ALU) 137 for making mathematical calculations, and associated memory registers, program controls, input output circuitry; a memory 134 and one or more file storage mediums 142 internal or external to computer 132 for storing data, a disk storage medium, disk drive 136, and disk drive 142 to aid in the storage of and to store selected data. Interfaces 138,140 between computer 132 and external accessories, such as a display monitor 120, keyboard 148, pointing device 119 and a printer 122, may also be provided. Interface 138 may also facilitate access to a local area network or other network of computers (neither illustrated), e.g., data transfer input/output, if required or desired. CPU 136 both controls, and is controlled by, other hardware, as well as software stored in memory 134 and on a portion of storage medium 142. In the illustrated case, storage medium 142 takes the form of a hard disk drive being internal to computer 132.

The invention herein is also drawn to a method of managing inventory. In one embodiment, the method includes the steps of: placing items having associated RFID tags into an inventory store or container; electronically interrogating the associated RFID tags and making an immediate record thereof; electronically interrogating the associated RFID tags upon removal of an item from the container; immediately recording the item removed from the container; updating one or more files in a billing and inventory management system to indicate the item having been removed; periodically electronically interrogating an area containing the item that had been removed from the container; and if the item having an associated RFID tag does not respond to the interrogating device, then updating one or more files in the billing and inventory management systems to indicate the non responsive event; and if the item has been returned to the container then immediately updating one or more files in the billing and inventory management systems. More particularly, with reference to FIG. 6, the method 600 for tracking inventory comprises: stocking an inventory store 160; interrogating with a transceiver a radio frequency identification device associated with one or more articles in the inventory store 165; processing 170 a communication with the transceiver to record the one or more articles entering the inventory store to increase inventory; initializing a timer 175 when the one or more articles are removed from the inventory store; interrogating 180 the one or more articles removed from the inventory store; and (a) decreasing 198 the inventory for the one or more articles if the radio frequency identification device of one or more articles removed from the inventory store indicates the one or more articles have been used 185 to the transceiver interrogation; and (b) not changing 190 the inventory for the responding one or more articles if the radio frequency identification device of one or more articles removed from the inventory store response indicates the one or more articles have not been used provided that the reentering the one or more articles into the interrogation field or the inventory store occurs before the timer times out 195.

In one embodiment whether the one or more articles have been used is determined if the radio frequency identification device is destroyed. In yet another embodiment, whether the one or more articles have been used is determined if the antenna is severed as an indication of article usage. In yet another embodiment, whether the one or more articles have been used is determined if an associated pair of radio frequency identification devices installed on an article produce receptions at different intervals of time. In yet another embodiment, whether the one or more articles have been used is determined if a first radio frequency identification device antenna is destroyed and a second radio frequency identification device antenna remains functional.

It is expressly intended that all combinations of those elements that perform substantially the same function in substantially the same way to achieve the same results are within the scope of the invention. Substitutions of elements from one described embodiment to another are also fully intended and contemplated.

I claim:

1. A system for tracking inventory comprising: an inventory store; one or more transceivers for interrogating one or more radio frequency identification devices associated with one or more articles; a processor in communication with the transceivers; code operable by the processor to increase the inventory when the one or more articles enter the inventory store; code operable by the processor to initiate a timer when the one or more articles are removed from the inventory store; code operable by the processor to decrease the inventory if one or more transceiver interrogations of a field indicate that the one or more articles removed from the inventory store does not respond to the interrogation or have been used; and whereby if one or more transceiver interrogations of a field indicate that the one or more articles removed from the inventory store have not been used, then the inventory is unchanged for the responding one or more articles provided that the timer has not timed out.

2. The system of claim 1, includes one or more transceiver/repeater combinations to enable interrogation of all associated radio frequency identification devices within a space.

3. The system of claim 1, including a universal product code reader to self purchase articles.

4. The system of claim 1, wherein the radio frequency identification device is adapted to be destroyed as an indication of the removed item being used.

5. The system of claim 1, wherein when the article is opened the antenna is dysfunctional as an indication of article usage.

6. The system of claim 1, wherein an associated pair of radio frequency identification devices are installed on an article.

7. The system of claim 1 wherein the transceiver detects the reception of two associated radio frequency identification devices at different intervals of time as indication that the article has been used.

8. The system of claim 1 wherein two or more transceivers determine if an associated pair of radio frequency identification devices each installed on separate parts of an article produce receptions from different locations as an indication that the article has been used.

9. The system of claim 6, whereupon opening of the article a first radio frequency identification device antenna is made dysfunctional and a second radio frequency identification device antenna remains functional.

10. The system of claim 7, wherein different intervals of time indicate that the separate parts of the article associated with the pair of radio frequency identification devices have been separated.

11. A container comprising a disabling means and a radio frequency identification device antenna integral to a seal whereby the disabling means acts upon the seal to open the container and disable the antenna.

12. A container comprising a cap, a body and a tab, wherein an associated antenna is connected to the tab and the body of the container whereby when the tab is removed it disables the antenna.

13. The container of claim 11 wherein the container is one of a canister or bottle.

14. The container of claim 11 wherein the container is a shrink-wrap container.

15. The container of claim 11 wherein the associated antenna forms a grid.

16. A seal comprising a disabling means and a radio frequency identification device antenna integral to the seal whereby the disabling means acts upon the seal to disable the antenna.

17. The seal of claim 16 wherein the seal is a shrink band seal.

18. A label comprising a disabling means and a radio frequency identification device antenna integral to the label whereby the disabling means acts upon the label to disable the antenna.

19. The label of claim 18 wherein the label is a shrink label.

20. A method for tracking inventory comprising: stocking an inventory store; interrogating a radio frequency identification device associated with one or more articles in the inventory store; processing a communication to record the one or more articles entering the inventory store to increase inventory; initializing a timer when the one or more articles are removed from the inventory store; interrogating the one or more articles removed from the inventory store; and (a) decreasing the inventory for the one or more articles if the radio frequency identification device of one or more articles removed from the inventory store indicate that the one or more articles have been used; and (b) not changing the inventory for the responding one or more articles if the radio frequency identification device of one or more articles removed from the inventory store response indicate the one or more articles have not been used provided that the reentering the one or more articles into the interrogation field or the inventory store occurs before the timer times out.

21. The method of claim 20 wherein the one or more articles have been used is determined if the radio frequency identification device is disabled.

22. The method of claim 20 wherein the one or more articles have been used is determined if the antenna is disabled on one or more articles.

23. The method of claim 20 wherein the one or more articles have been used is determined if an associated pair of radio frequency identification devices installed on an article produce receptions at different intervals of time.

24. The method of claim 20 wherein the one or more articles have been used is determined if an associated pair of radio frequency identification devices installed on an article produce receptions from different locations.

25. The method of claim 20 wherein the one or more articles have been used is determined if a first radio frequency identification device antenna is disabled and a second radio frequency identification device antenna remains functional.

* * * * *

UNITED STATES PATENT AND TRADEMARK OFFICE
CERTIFICATE OF CORRECTION

PATENT NO. : 7,486,188 B2  Page 1 of 10
APPLICATION NO. : 11/389749
DATED : February 3, 2009
INVENTOR(S) : Van Alstyne It is certified that error appears in the above-identified patent and that said Letters Patent is hereby corrected as shown below:

The title page, showing an illustrative figure, should be deleted and substitute therefor the attached title page.

Delete Column 1 line 1 through Column 18 line 6 and insert Column 1 line 1 through Column 16 line 61 as attached.

Signed and Sealed this

Sixteenth Day of November, 2010

David J. Kappos
*Director of the United States Patent and Trademark Office*

(12) United States Patent
Van Alstyne

(10) Patent No.: US 7,486,188 B2
(45) Date of Patent: Feb. 3, 2009

(54) SYSTEM, ARTICLE AND METHOD FOR TRACKING AN INVENTORY

(76) Inventor: Peter C. Van Alstyne, 433 Clinton St., Brooklyn, NY (US) 11231

( * ) Notice: Subject to any disclaimer, the term of this patent is extended or adjusted under 35 U.S.C. 154(b) by 493 days.

(21) Appl. No.: 11/389,749

(22) Filed: Mar. 27, 2006

(65) Prior Publication Data
US 2006/0290471 A1 Dec. 28, 2006

Related U.S. Application Data

(60) Provisional application No. 60/694,295, filed on Jun. 27, 2005, provisional application No. 60/760,001, filed on Jan. 18, 2006.

(51) Int. Cl.
*G08B 13/14* (2006.01)

(52) U.S. Cl. .......... 340/572.1; 340/505; 340/527; 340/539.1; 340/539.13; 340/539.32; 340/5.91; 340/5.92; 340/10.1

(58) Field of Classification Search .......... 340/505, 340/506, 527, 539.1, 539.23, 539.32, 568.1, 340/571, 3.1, 825.36, 825.49, 5.91, 5.92, 340/5.9, 10.1, 572.1
See application file for complete search history.

(56) References Cited

U.S. PATENT DOCUMENTS

| | | | | |
|---|---|---|---|---|
| 4,940,974 | A * | 7/1990 | Sojka | 340/10.2 |
| 6,040,781 | A * | 3/2000 | Murray | 340/825.22 |
| 6,708,879 | B2 * | 3/2004 | Hunt | 235/385 |
| 2004/0034581 | A1 * | 2/2004 | Hill et al. | 705/28 |
| 2004/0220869 | A1 * | 11/2004 | Perera | 705/37 |
| 2008/0052200 | A1 * | 2/2008 | Bodin et al. | 705/28 |
| 2008/0183599 | A1 * | 7/2008 | Hill et al. | 705/28 |

* cited by examiner

*Primary Examiner*—Daryl C Pope
(74) *Attorney, Agent, or Firm*—Howard IP Law Group, PC

(57) ABSTRACT

The present invention pertains to a storage facility containing consumable items that updates an inventory when items are stored, removed and consumed. A product scanner and a computer installed in the facility use RFID technology to determine if an item has been consumed or removed from a locale. Items in the facility have RFID tags attached. The system interrogates the tags and if a tag becomes disabled, displaced or non-existent due to consumption or removal from a locale the system provides instantaneous status. The computer transmits consumption information to a central location for billing, inventory management, market research information and can transmit the same to other processing units such as hand held computers possessed by staff that replenishes the facility. This system prevents used items from being placed back into the housing facility and being incorrectly accounted for as usable/billable and provides for greater room servicing efficiencies.

16 Claims, 18 Drawing Sheets

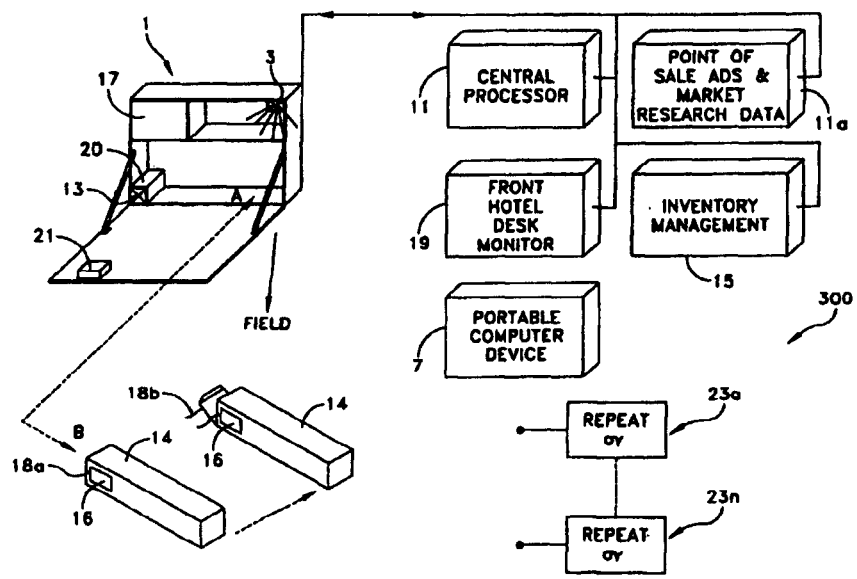

SYSTEM, ARTICLE AND METHOD FOR TRACKING AN INVENTORY

CROSS-REFERENCE TO RELATED APPLICATIONS

This application claims the benefit under 35 U.S.C. 119 (e) of U.S. Provisional Application Ser. No. 60/694,295, filed Jun. 27, 2005 and U.S. Provisional Application Ser. No. 60/760,001, filed Jan. 18, 2006.

FIELD OF THE INVENTION

The invention generally relates to the field of inventory stores, such as storage facilities, or commercial mini bars for beverages, snacks, gifts, sundries and other consumables.

DESCRIPTION OF THE PRIOR ART

Various portable cosmetic and toilet article cases have been disclosed that carry toiletries, medicines and other sundry articles. Examples are disclosed in U.S. Pat. Nos. 6,886,695, 6,854,472, 6,796,431 and 5,318,053. Other examples include U.S. Pat. Nos. 1,613,536, 1,828,863 and 5,163,457. Without limiting the present invention, it is believed to be desirable to provide a cabinet that is easily transportable within and between locations and that blends into the reflective properties of a generally larger mirror or mirrored cabinet upon which it may be installed. However, portable cabinets typically are unsophisticated and are not equipped to accomplish automatic inventory tracking. Therefore, it may prove desirable to provide a cabinet that may be adapted for a variety of applications, ranging from a sundry or medicine dispenser to a vanity, with minimal redesign or manufacturing tooling, as well as have the features of maintaining a record of its inventory.

Gibb, WO 2005/015510A1, discloses a computerized-sensing system for a mini bar in a hotel room with a dispenser. The entire disclosure of Gibb is hereby incorporated by reference as if being set forth in its entirety herein. Linton, US 20040232231A1, discloses a radio frequency identification method and system of distributing product from a micro-warehouse with a door. The entire disclosure of Linton is hereby incorporated by reference as if being set forth in its entirety herein.

Kipp, US 20050051624A1 discloses an apparatus and method for detecting tampering with containers and preventing counterfeiting, especially as such tampering is detected by removal of a cap, however it does not address how such a system would operate in the larger context of a system designed to track an inventory.

Without limiting the present invention, it is believed to be desirable to maintain a real time inventory control for items that are dispensed from any inventory storage facility such as industrial inventory storage facilities, cabinets or in-room containments, but where the items may not have been used, and which may be subsequently returned to the inventory. Likewise, it is believed to be desirable to maintain a real time inventory control for items that are dispensed from a containment and subsequently used. Also, it may prove desirable to inventory accounts or reduce billing errors that are caused by items being moved from containments but not used. Also, it may prove desirable to create additional point of sale opportunities in applications such as hotel rooms. Additionally, it may prove desirable to increase efficiency by reducing staff costs associated with entering dwellings, checking the level of inventory related to sundries and/or consumables, and identify missing items, without having to keep track of an exact location within the room. Additionally, it may prove desirable to provide a remote inventory in real time (or substantially real time), while preventing unnecessary physical checking of items or unnecessary disturbing of guests; the latter occurring when hotel service personnel have to knock on a hotel room door in order to determine if a replacement sundry is necessary or if a room is vacant.

Radio frequency identification device ("RFID") technology allows data to be transmitted by a product containing an RFID tag, which is read by an RFID transceiver. The data transmitted can provide identification about the product, such as date of purchase. RFID technology does not require contact or even line-of-sight to be read. Passive RFID tags can be as small as 0.3 mm and do not require batteries since they are powered by the radio frequency signal of a RFID transceiver. Passive RFID tags can be read from a distance of about 30 feet and it is anticipated that as RFID technology improves passive RFID's will be read from further and further distances. Semi-passive RFID tags contain a small battery that boosts the range. To track an inventory in a hotel room especially to ascertain its use would prove to be am improvement of the current method of physical inspection to ascertain if a product has been used.

SUMMARY OF THE INVENTION

The present invention pertains to an inventory store, such as a mini bar, a safe, a room, or other containment holding items that automatically records items being placed in and removed from an inventory storage, and thereby maintains a real-time inventory. A product scanner and a computer installed in the container, or in the proximity of the container, indicate that an item has been placed, removed or returned by a service worker, or patron to provide at least one of billing, inventory management, point of sale advertisement and market research information.

One aspect of the invention includes a system for tracking inventory comprising: an inventory store such as a mini bar; one or more transceivers for interrogating one or more RFIDs associated with one or more articles; a processor in communication with the transceivers; code operable by the processor to increase the inventory when the one or more articles enter the inventory store; code operable by the processor to initiate a timer when the one or more articles are removed from the inventory store; code operable by the processor to decrease the inventory if one or more transceiver interrogations of a field indicate that the one or more articles removed from the inventory store does not respond to the interrogation or have been used; and whereby if one or more transceiver interrogations of a field indicate that the one or more articles removed from the inventory store have not been used, then the inventory is unchanged for the responding one or more articles provided that the timer has not timed out.

According to an aspect of the present invention, a microprocessor transmits information as to the removal of an item for sale to a central location in the facility, such as a hotel front desk or other central processing unit, and to a hand held computer possessed by personnel, such as a hotel staff.

According to another aspect, an RFID tag is utilized on item packaging to track items for sale, and is adapted to be destroyed, i.e., have the responsiveness to RF interrogation signaling disabled, when a user consumes the item. Destroying the tag occurs upon opening the package of a purchased item and indicates to the microprocessor via the RF interrogation the item no longer exists. This prevents an item being placed back into the housing facility and being incorrectly accounted for as usable/billable.

According to another aspect of the invention, a pair of RFID tags are utilized on one package to track when the item has been opened for consumption. When one of the packaging components, such as a cap is disassociated from the second component, such as a bottle, a transceiver that interrogates RFID tags detects the resulting displacement. The system subsequently accounts for the item having been used and generates a corresponding line item in a related customer bill.

In yet another aspect of the invention, an RFID transmitting device interrogates RFID tags affixed to product packaging, determines on a regular cycle the inventory resident, and not destroyed within an area, such as a hotel room.

BRIEF DESCRIPTION OF THE DRAWINGS

The invention may be understood from the following detailed description when read in connection with the accompanying drawings. The various features of the drawings are not specified exhaustively. On the contrary, the various features may be arbitrarily expanded or reduced for clarity. Included in the drawings are the following figures:

FIG. 1 illustrates a perspective view of an empty configuration of a container according to an aspect of the present invention;

FIG. 2a illustrates a sundry having a disabled RFID tag incorporating product package in accordance with an aspect of the present invention;

FIG. 2b illustrates a sundry having a disabled RFID tag incorporating product package in accordance with an aspect of the present invention;

FIG. 3a illustrates a system for dispensing and inventorying consumables in accordance with an aspect of the present invention;

FIG. 3b illustrates a system for dispensing and inventorying in accordance with an aspect of the present invention;

FIG. 4a illustrates a product package in accordance with an aspect of the present invention;

FIG. 4b illustrates a product package in accordance with an aspect of the present invention;

FIG. 4c illustrates a product package in accordance with an aspect of the present invention;

FIG. 4d illustrates a product package in accordance with an aspect of the present invention;

FIG. 4e illustrates a product package in accordance with an aspect of the present invention;

FIG. 4f illustrates a product package in accordance with an aspect of the present invention;

FIG. 4g illustrates a product package in accordance with an aspect of the present invention;

FIG. 4h illustrates a product package in accordance with an aspect of the present invention;

FIG. 4i illustrates a product package in accordance with an aspect of the present invention;

FIG. 4j illustrates a product package in accordance with an aspect of the present invention;

FIG. 4k illustrates a product package in accordance with an aspect of the present invention;

FIG. 5 illustrates a computer system for inventory control in accordance with an aspect of the present invention.

Figure 6:
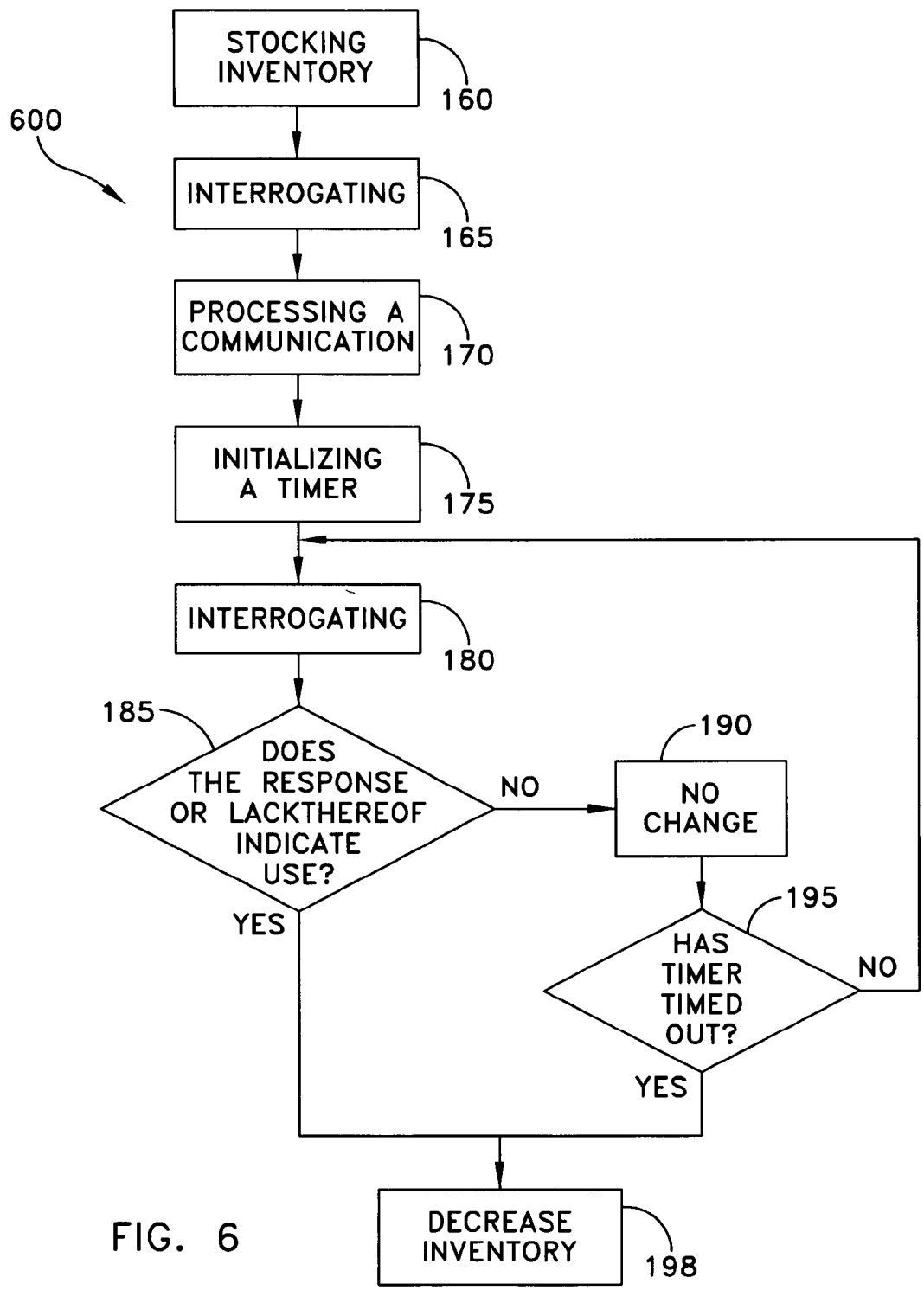
FIG. 6 illustrates a method for inventory control in accordance with an aspect of the present invention.

FIG. 6 illustrates a method for inventory control in accordance with an aspect of the present invention.

DETAILED DESCRIPTION OF THE INVENTION

In the figures to be discussed, the circuits and associated blocks and arrows represent functions of a process according to an aspect of the present invention, which may be implemented as electrical circuits and associated wires or data busses, which transport electrical signals. Alternatively, one or more associated arrows may represent communication (e.g., data flow) between software routines, and/or computing devices, particularly when the present method or apparatus of the present invention is embodied, in whole or part, as a digital process.

The present invention is particularly useful in connection with a facility where items are stored in a permanent inventory store or portable inventory store such as a container, a bathroom cabinet, a mini-bar, amenity basket, safe, entire hotel room/suite or other form of security storage box. The present invention will be discussed as it relates to sundry containers for non-limiting purposes of explanation only. As shown in FIG. 1, one embodiment of the invention is a sundry container having an inventory management system (not shown), such as by way of example and not limitation, a hotel bathroom. A user of the container pushes a mirror for frontal access, such that a front panel lowers via a gas cylinder-spring to a tray position. The opened container reveals various toiletry items available for convenient purchase. The compartments can be easily removed and replaced by other compartmentalized interiors that suit its utility without significant re-design (e.g., cosmetic shelving, medication dispenser, shaving kit, contact lens organizer, etc.). By way of non-limiting example only, the sundry container may be secured to a stationary mirror or medicine chest mirror using a double-sided strong adhesive tape or 3M Dual Lock or Velcro (each Trademarks of 3M Corporation) tape. This allows for easy installation regardless of technical know-how. In the illustrated embodiment, the sundry container has mirrors on all sides so as to be aesthetically pleasing to the eye, particularly when installed on a mirror.

FIG. 1 represents a perspective view of the empty configuration of an apparatus according to an aspect of the present invention. A compact cabinet 1 includes: a back panel 2; two side panels 4, each having a mirrored surface; a top panel 6 that may also be mirrored; a bottom panel 10, and a hinged front panel 8, that may be mirrored and when pushed, opens outward, collectively defining an interior cavity. The mirrored surfaces may optionally include magnification optical properties, to enlarge the view of reflected objects, and may optionally be magnetized to hold metal objects.

One or more vertically oriented compartments 12 in the internal cavity may optionally have a spring loaded or otherwise hinged panel. By way of non-limiting further example, compartment 12 may be configured such that it opens with an outward motion, so that when main body front panel 8 is opened the prior restraint offered by the front panel 8 is removed, thus allowing the one or more vertically oriented compartments 12 to spring forward and open.

In yet another embodiment, the front panel 8 may include a hinge system that permits the front panel 8 to open either into a horizontal tray position or at a right angle.

The cabinet 1 illustrated in FIG. 1 stores and inventories, by way of example, sundry items such as is illustrated in FIG. 2a and FIG. 2b. The cabinet 1 includes one or more processors 13 and one or more RFID scanners or transceivers (hereinafter referred to as transceivers) 3 to track product entering and leaving its enclosure. Each product resident in cabinet 1 is outfitted with an RFID tag. In FIG. 2b a product package 14 contains a consumable product, which in the illustrative example, is a tube of toothpaste 19. Affixed to box 14 is an RFID tag 16. The RFID tag 16 is utilized to provide Stock Keeping Unit ("SKU") identification or location information, and other specifics about the product tagged, such as price, color, date of purchase, etc.

In a non-limiting embodiment, RFID tag 16 contains a microchip (such as a silicon chip) and antenna that allow it to receive and respond to radio-frequency interrogations from an RFID transceiver. Each RFID tag uniquely identifies the product to which it is attached. RFID tag 16 is scanned to retrieve the identifying information.

According to an aspect of the present invention, passive RFID tags, e.g., RFID tags having no internal power supply, may be utilized, e.g., as tag 16 for product 19 as shown in FIG. 2b. As shown in FIG. 2a, minute electrical currents induced in the RFID tag antenna 18a from incoming radio frequency (RF) signals power a CMOS integrated circuit located in the tag to both power up and transmit a response. Passive tags conventionally signal by backscattering the carrier signal from the transceiver, such that the antenna both collects power from the incoming signal and also transmits the outbound backscatter signal. Passive tags conventionally have practical read distances ranging from about 2 mm (ISO 14443) up to about a few meters (ISO 18000-6), depending on the chosen radio frequency. Conventional transceiver RFID technology can be used in a frequency range of about 800 MHz to about 1 GHz. In many products the low power consumption enables read performances extended to distances up to 10 meters. Conventional RFID technology also features simultaneous operation of multiple tags employing anti-collision methods such that up to 460 tags per second can be reliably read. RFID chips typically carry a maximum 2,000 bytes of data, although more complicated RFID tags having greater storage and or processing capabilities may be used.

FIG. 3a illustrates a system 300 for creating and tracking an inventory comprising: a inventory store 1, a transceiver 3 for interrogating a RFID tag 16 associated with a consumable article such as sundry 14. A processor 13 in inventory store 1 communicates with the transceiver 3 such that when the one or more articles enter the inventory store 1 the RFID tag 16 in response to the transceiver 3 interrogation, communicates with the transceiver 3, and in response thereto the transceiver 3 communicates with the processor 13 having code operable by the processor 13 to increase the inventory. The articles in the inventory store 1 are also detected when they are removed from the cabinet during a selection by a transceiver. The detection can optionally cause a timer to initiate a timeout stored in the processor 13 memory. Such timers can be implemented in hardware or in software as resident in processor 13. If the RFID tag of one or more articles removed from the inventory store 1 do not respond to the transceiver 3 interrogation then the processor 13 having code operable by the processor 13 decreases the inventory; and likewise if the RFID tag of one or more articles removed from the cabinet 1 responds to the transceiver 3 interrogation then the transceiver is not billed.

More particularly as shown in FIG. 3a, product package 14 having affixed thereto an RFID tag 16 is stored in inventory store 1. When package 14 is selected by a user and removed from the sundry inventory store 1 into a room as indicated by the designation FIELD, the removal is detected by a detection means, which may typically include one or more RFID transceivers, such as RFID transceiver 3. RFID transceiver 3 is depicted as mounted to inventory store 1; however one or more RFID transceivers may be installed anywhere, such as transceiver 20 or transceiver/repeaters 23a and 23n, limited essentially by the ability of any particular transceiver and an RFID tag's ability to communicate with the transceiver. For example, inventory store 1 may be installed in a hotel bathroom; while a RFID transceiver/repeater is located in an adjacent room to meet the objects of the invention herein.

For non-limiting purposes of explanation, processor 13 will be discussed as it relates to a microprocessor implementing computer. Drawing attention to FIG. 3a and FIG. 3b, processor 13 having code operable by the processor 13 has the ability to transmit and receive information through one or more input/output (I/O) ports operating under a communication protocol to and from a transmit/receive (T/R) transceiver 3 device, transceiver 20, transceiver/repeater 23a device, and transceiver/repeater 23n device. Transceiver 3 and all other transceivers used herein may take the form of a conventional RFID transceiver. Transceiver 3 may periodically interrogate the RFID tags within its transmission and reception range. The periodic transmissions permit processor 13, and associated software and/or firmware, to ascertain the state of the current inventory within the transmission and reception range of transceiver 3 or any other transceivers reception range transmitting/receiving information to processor 13.

According to an aspect of the present invention, when a sundry, such as product package 14, is removed from the inventory store 1, and not replaced within a predetermined period of time, as determined by processor 13 through periodic interrogations using transceiver 3, then processor 13 having code operable by the processor 13 communicates signals to one or more systems such as inventory management system 15 and/or central processing system 11 (which may include a billing system), hotel desk monitor 19, and point of sale and market research system 11a to reflect consumption of the corresponding item or to permit the administration of the system to take appropriate action.

According to an aspect of the present invention, a first communication from processor 13 sends information related to the removal, or determination of product usage via RF interrogation or replacement of an item into the inventory store sundry cabinet 1 to one or more systems such as inventory management system 15 and/or central processing system 11 (which may include a billing system), and point of sale and market research system 11a, front hotel desk monitor 19 and portable computing device 7 through a transmission channel, such as a WIFI transceiver, a Blue Tooth transceiver, a telephone line, a DSL telephone line, or a high speed digital network, all by way of non-limiting example. In a simplified form, one or more messages indicative of the changed product state may be communicated and recorded. In other forms, central processing system 11 (which may include a billing system) may electronically process the received information to automatically update billing and/or inventory databases in a conventional manner.

According to an aspect of the present invention, a second communication from processor 13 sends information to the portable computing device 7, that may, for example, take the form of a personal digital assistant (PDA), such as a handheld Palm or similar device operated by a staff servicing the room from which the transmission emanates. This signal is received outside a guest's door, allowing staff, such as a maid, to check the bathroom sundry cabinet 1, a room closet, the room itself, or mini-bar without having to knock or open the door to the room. Such staff now has an immediate and current record of the inventory change. It is recognized that the central processor 11 or inventory management system 15 rather than processor 13 may in an alternate embodiment send inventory information directly to the portable computing device 7, after central processor 11 or inventory management system 15 are updated via processor 13.

It is apparent that more than one sundry may be removed from the inventory store at any given time. Nevertheless the system 300 continues to keep track of all existing non-used products utilizing techniques and methods well known to those skilled in the art of RFID technology. For example, many RFID systems employ an Aloha protocol as an anti-collision mechanism, which serves as but one type of protocol that the present invention may employ. The Aloha protocol sorts through a population of RFID tags and assigns each a node address. Transceiver 3 sends out a request command to all tags in its range. The tags respond by selecting a random number. This random number becomes the tag's slot number. The transceiver 3 then polls the tags in its range for slot number zero (0). All tags that have chosen a random number of zero (0) respond. If exactly one tag responds, then the transceiver 3 assigns a unique node address to the tag. If more than one tag responds, the transceiver 3 ignores the response. The polling proceeds with the transceiver 3 polling for the next slot number. Upon reaching the end of the polling sequence, the transceiver 3 starts again by requesting tags that have not been assigned a node address to select a new random number. This process continues until all tags in range have been assigned unique node addresses. At this time communication with individual tags occurs without a collision threat. In the present invention, the transceiver 3 establishes and stores a sundry article's tag slot number as it is initially inventoried in the inventory store 1. Thereafter, when the article is removed from the inventory store 1, the transceiver again stores an article's identification and thereafter need only scan for the articles that have left the inventory store 1 and that do not have a definite disposition, as for example determined to be used.

According to an aspect of the present invention, using a product disables an associated RFID tag, such that the package cannot be reused, as in some instances to "fool" the system that an item is being returned for credit. Commercially available RFID tags are measured at 0.4 mm×0.4 mm, and are thinner than a sheet of paper. Accordingly, such RFID tags are practically invisible. However, these tags may prove difficult to destroy. According to an aspect of the present invention and by way of non-limiting example, the RFID tag may be manufactured with a printing process that serves to create the antennae. One method of disabling the tag is to destroy the effectiveness of the antenna.

According to another aspect, an RFID tag is utilized on item packaging to track items for sale, and is adapted to be destroyed, i.e., have the responsiveness to RF interrogation signaling disabled, when a transceiver interrogates the item. Destroying the tag occurs upon opening the package of a purchased item. When the transceiver does not get a transmitted response from the RFID tag as a result of interrogation within its range, it sends a signal to processor 13 that the item no longer exists within that range. Processor 13 then determines from the data retrieved from other transceivers associated with it that the item no longer exists in the entire predetermined range and has been consumed. This prevents an item being placed back into the housing facility and being incorrectly accounted for as usable/billable. As illustrated in FIG. 2a, according to an aspect of the present invention, the RFID tag 16 and associated functional antenna 18a. When the package is opened the antenna is severed as shown with reference to antenna portion 18b. In FIG. 2b opening package 14 exposes as for example product 19. In opening the package 14 the RFID tag 16 antenna is severed as shown with reference to antenna portion 18b. Alternatively, where the antenna is printed, the antenna may be disconnected from the RFID tag body when the package is twisted or torn open to retrieve the contents.

According to another aspect of the invention, the sundry inventory store 1 may include a Faraday shield so as to electromagnetically insulate items therein from external electronic radiation utilized in interrogating the room. More particularly, according to an aspect of the present invention, upon a product being removed from the inventory store cabinet 1, an RFID tag affixed to the sundry may be interrogated by a transceiver 3 to collect data useful for verifying what is entering and leaving the cabinet 1 inventory store. The collected data is typically provided to processor 13. When the product leaves cabinet 1 transceiver 3 detects the event and updates processor 13. If the product is returned to the sundry cabinet 1, it again passes through the interrogation field of transceiver 3 (e.g., a gateway interrogator). The reception of an RFID response is provided to processor 13. If the attached RFID tag is determined by the management system to have previously become non-responsive to interrogation by for example transceiver 20, processor 13 management system concludes the corresponding product was consumed. Transceiver 3 and transceiver 20 interrogation may be performed at a periodic rate depending on a design choice as for example, every 1, 2, 5, 10, 15, 20 or 30 seconds, all by way of non-limiting example, so that any change occurring within that interval is noted as either a selection or a return. Of course, faster or slower rates may also be used. In the event that the item is returned to the sundry container in an unopened condition, the inventory can be reversed.

As illustrated in FIG. 3a, according to an aspect of the present invention, semi-passive RFID tag 16 incorporates no power source, however a power source such as a battery, may be used. A battery would allow the tag integrated circuit to be constantly powered. In such an embodiment, the antenna 18a would not need to collect power from the incoming signal. Antenna 18a could therefore be optimized for backscatter signaling. Further, semi-passive RFID tags are generally faster in response and therefore stronger in reading ratio compared to passive tags. By way of non-limiting example, as with the passive RFID tags, semi-passive RFID tags may be manufactured using a printing process that creates the antenna. Using a semi-passive RFID tag may facilitate detection by remote RFID interrogators positioned remote from inventory store 1.

As illustrated in FIG. 3a, the transceiver 3 is focused across the inventory store 1 opening to operate as a security gate to detect whether a sundry has been removed from and/or placed into the sundry container. Optionally, one or more directional antenna can be used for interrogation signaling to mitigate potential cross-talk from products having RFID tags inside the inventory store 1. Alternatively, transceiver 3 generally interrogates inventory store 1 and collision avoidance may be used. In either event, if a user returns the sundry, the item is recorded as being present (e.g., a register may be incremented, a flag set or a bit set) and the inventory updated. More particularly, the transceiver 3 comprises a transceiver and a decoder, and emits a signal activating through its antenna (not shown) the RFID tag 16 so as the tag is read and/or transmits data to the transceiver 3. In this manner, the inventory is created and recorded when an RFID tag passes in the direction BA through the electromagnetic RF interrogation field associated with a transceiver 3. Essentially, a removed product status is determined from the inventory established when the product is initially placed in cabinet 1. In the illustration the RFID tag 16 detects the transceiver 3 activation signal and the RFID tag 16 responds by transmitting a code encoded in the tag's integrated circuit (silicon chip) indicative of what it is (e.g. "SKU"). The transceiver 3 reads the data and the data is passed through processor 13 and then to the host computer 11. Likewise, when the RFID tag 16 passes in the direction AB through the electromagnetic RF interrogation field associated with a transceiver 3 the processor 13 and/or central processor flags the event signifying that a product such as sundry 14 has been removed. A removed product status is determined from the inventory established when the product was initially placed in cabinet 1. Whether the data is processed at the transceiver 3 or processor 13 or central processor 11 is a design choice. The application software typically used in this process often employs Physical Markup Language (PML). PML is a markup language based on XML for communicating a description of physical environments and the objects within them, their relationships to the user of the product associated with an RFID tag, and the space where the product may be contained.

Although RFID tags are usually intended for short-distance use, they can be interrogated from greater distances utilizing a high-gain antenna or utilizing additional scanners that transmit and receive RFID tag input data and retransmit the data to a remote receiver, allowing the contents of a room to be scanned for RFID packaged goods anywhere in a room or suite of rooms. As shown in FIG. 3a and FIG. 3b, when long distances between the transceiver 3 and the package such as package 14 cause a deterioration in RFID tag return signals the system 300 may incorporate one or more transceiver/repeater combinations $23_a$-$23_n$. Transceiver 20 may have a direct connection or a radio connection to communicate with processor 13. Likewise transceiver 20 may have a direct connection or a radio connection to communicate with the one or more repeaters $23_a$-$23_n$. In alternate configuration repeaters $23_a$-$23_n$ may have a direct connection or a radio connection to communicate with processor 13. Each of these alternative communication modes are design choices.

In one embodiment of the present invention as shown in FIG. 3b, the processor 13 sends a signal to the transceiver 20. Transceiver 20 transmits and receives data communication from a remote transceiver/repeater, such as one or more of the repeaters $23_1$-$23_n$ to interrogate products, such as sundry package 14 that has been removed from the cabinet 1. One remote transceiver/repeater $23_1$ is configured to scan the field where the product such as sundry package 14 may be situated, such as within a FIELD or room as shown in FIG. 3a. When the transceiver 23 receives its RFID input it transmits the data to the transceiver 20 and transceiver 20 communicates the data to processor 13.

Optionally, and particularly useful for individuals that may have a visual impairment, when an item is removed from the inventory store 1, and the attached RFID tag is identified, such as by processor 13, a conventional speech generator and speaker included in a computing device 17 (FIG. 3a) internal or external to inventory store 1, may be used to provide an audible indication that identifies the product, such as: the sundry name, use instructions and product use warnings.

Optionally, device 17 also provides for video capability, such as by incorporating a liquid crystal display or technological equivalence ("LCD") having corresponding menu screens. When processor 13 identifies a removed item, one or more targeted promotional opportunities may be identified and corresponding offers presented on the LCD. For example, "buy 2 get 1 free" offers may be presented by removing a single sundry. Optionally, a point of sale system 11a may send audio and/video content to the device 17 for targeted advertising (e.g., commercial for new razor in the box, location of nearest hairdresser or barber, masseuse, gym, doctor, tailor etc.) from a programmed schedule. Optionally, a user input, such as via a touch-screen or separate buttons can be used by a guest to confirm purchases (Yes or No questions) which input to processor 13 and communicated to point of sale system 11a for further interaction with the consumer.

According to an aspect of the present invention, a UPC reader 21 may be used in combination with, or in lieu of, one or more of the RFID transceivers. Such a UPC scanner 21 may be positioned in any convenient location on the cabinet 1 and made available to the guest to "self purchase" items. A guest chooses an item and then scans the UPC tag that has been outfitted previously on the item with the miniature UPC laser scanner mounted on the sundry container. A method of multiple scans or LCD touch sensitive technology may be used to confirm purchases. Again this information may be provided to processor 13.

In one embodiment the present invention when an item is selected and pulled out for usage and is not replaced within a certain time period, such as by way of example, one (1) hour, a timer implemented in hardware, firmware or software located in the processor 13 or central processor 11 indicates that item has been selected and removed by a customer or patron and further that the customer is to be charged for the use. In this embodiment the inventory is decremented.

Different products or sundries typically require packaging suited for their intended purpose and may require particular transceivers. Since product packaging differs depending on the item for sale or use, different inventive solutions to provide an inventory system that records when a product has been used, opened, consumed or removed from the room. In another embodiment of the present invention an associated pair of RFID tags are installed on a product package. Having a pair of RFID tags permits at least four (4) different states of the pair to be interrogated. For example, tag W and tag X are both functioning, or tag W is functioning and tag X is not functioning or tag W is not functioning and tag X is functioning tag or finally neither W is functioning nor tag X is functioning. These combinations prove useful in determining whether certain in-room convenience items are first utilized and then whether the items are removed from the room. As for example, if a bathrobe has contained thereon two RFID tags W and X and only W must be destroyed to use the bathrobe, but X need not be. After the robe were used interrogating the tags W, X will disclose that the bathrobe was used but not removed from the room. If subsequently the bathrobe were to be removed from the room and not returned within a given period of time as established in the processor 13 e.g., the front desk interrogates processor 13 when a guest checks out, then the absence of a signal from tag X would indicate that the robe was permanently removed from the room, for which the customer would be billed.

In yet another non-limiting example, the transceiver 3 detects the reception of two associated RFID tags at two different intervals of time. When the system 300 transceiver 3 interrogates the field it associates a paired set of RFID tags having an equivalent or approximately equivalent displacement determined from the time of interrogation of each until the time of reception at the transceiver source. The transceiver 3 or processor 13 logs the nearly identical response times as emanating from the same product package. Upon opening of the package one of the pair of RFID tags is destroyed, however the second RFID tag remains in tact. When system interrogates the field, it only receives one of the two previously recorded pairs and detects the difference as indicating that a package has been opened.

In yet another non-limiting example tracking inventory may be effectuated when the one or more articles have been used if two or more transceivers (additional transceivers would provide for an exact location) determine that an associated pair of radio frequency identification devices installed on an article produce receptions from different locations. The transceiver 20 and 23 or any other pair of transceivers as might be employed, may each independently detect the reception of two associated RFID tags at two different intervals of time, which can each be related to differences in location within the field. When the system 300 transceiver interrogates the field it associates a paired set of RFID tags having an equivalent or approximately equivalent displacement. However, when the paired set of RFID tags do not have an equivalent or approximately equivalent displacement in any RF interrogation other than the initial scan, this would indicate the paired set of RFID tags have been moved away from each other. This would occur if one of the tags were attached to the main body of an item e.g., a bottle, and the other tag in the pair were attached to a bottle top or cap. This would indicate the item was opened or used.

In yet another embodiment of the present invention an associated pair of RFID tags are installed into a product package. In FIG. 4a a product package in accordance with an aspect of the present invention includes a container 31 having a cap 35. Mounted integral to the cap 35 is an RFID device 33. The RFID device 33 includes an antenna 32. The RFID device 33 also may be molded into or bonded to the cap in any location using fusing, glue or other suitable means known to those skilled in the art of plastic manufacture or bonding materials. A second RFID device 34 is mounted integral to the container 31 using techniques such as molding or bonding to the container in any location using fusing, gluing or other suitable means known to those skilled in the art of plastic manufacture or bonding materials. The RFID device 34 includes an antenna 36. Before the 35 cap is separated from the container 31, the system 300 interrogates the field containing the container 31 and associates the pair of associated RFID tags 34,33 as having equivalent or approximately equivalent displacements from the reader source and logs the nearly identical response times received as emanating from the same product package, container 31, in this example. Upon opening of the package the pair of RFID tags 34,35 are separated and therefore displaced having been attached to different parts of the package, such as by cap 35 having been removed and displaced from its container 31. In this embodiment both RFID tags 34,35 remain in tact. When system interrogates the field, it receives the two previously recorded pairs and detects the time displacement difference as indicating that a package has been opened.

FIG. 4b illustrates a product container 41 popular in dispensing liquid consumable beverages in accordance with an aspect of the present invention. An associated disabling means or a leverage means such as tab 42, as fixed to container 41 through fastening member 46, cooperate with RFID tag 44 which is bonded to the top of container 41 such that a breaking container seal 47 cooperates to sever or disable antenna 45 of the RFID tag 44. Tab 42 through a disabling or leverage force, breaks the seal 47 with the aid of a score 43 to open the container. Integral to the score and/or opening is the RFID tag 44 antenna 45. Upon pulling the tab 42, the container 41 score 43 gives way and the RFID tag 44 antenna 45 is severed disabling the RFID tag 44 thereby indicating that the product container has been opened.

In yet another embodiment of the present invention is a container comprising a cap, a body and a tab, wherein an associated antenna is connected to the tab and the body of the container and which when the tab is removed severs the antenna. More particularly, FIG. 4c illustrates a product container 51 suitable for dispensing liquids in accordance with an aspect of the present invention where an RFID tag 54 and an associated antenna 55 are attached via an adhesive bond to the body of the container 51. The RFID tag 54 is also bonded to the cap 57. Integral to the tab 52 is the RFID tag 54 having an associated antenna (not shown). When the tab 52 is pulled, it forces the antenna to be severed from the RFID tag 54 thereby disabling the RFID tag and indicates the product container 51 has been opened.

FIG. 4d illustrates a product container 61 suitable for dispensing foods in accordance with an aspect of the present invention, where RFID tag 66 and an associated antenna 64 are attached via a thermal, pressure or adhesive bond to the body of the container 61. By way of example and not limitation container 61 may be manufactured from polyvinyl chloride film, super shrink polyolefin film or polypropylene. Integral to the tab 63 is the RFID tag 66 antenna 64, such that when tab 63 is pulled forces the antenna 64 to be severed from the body of RFID tag 66 disabling the RFID tag 66 indicating the product container 61 has been opened.

FIG. 4e illustrates a product container 71 suitable for dispensing foods in accordance with an aspect of the present invention. An RFID tag 72 and associated grid antenna 73 have a plurality of elemental antenna attached via a thermal, pressure or adhesive bond to the body of container 71. By way of example and not limitation, container 71 may be manufactured from polyvinyl chloride film, super shrink polyolefin film or polypropylene. Integral to one of two tabs 74 is the RFID tag 72 grid antenna 73, which when either of the tabs 74 is pulled it forces at least one element of the grid antenna 73 to be severed from the RFID tag 72 indicating the product container 71 has been opened.

An aspect of the present invention comprises a seal having a disabling means, and radio frequency identification device antenna integral to the seal whereby the disabling means acts upon the seal to disable the antenna. FIG. 4f illustrates a product container 81 in accordance with an aspect of the present invention where an RFID tag 88 having an antenna 82 is bonded via a thermal, pressure or adhesive bond to a protective foil seal 85 that is inserted into the top portion of the container 81. By way of example and not limitation, container 81 may, be manufactured from glass, metals or plastic such as polyvinyl chloride, polyolefin or polypropylene. Through the application of downward forces a mechanical advantage means or manufactured weakness, such as perforated area 83 along the periphery of the foil 85, opens the container 81. Integral to the foil 85 and/or opening is the RFID tag 88 and associated antenna 82. Upon pushing perforated area 83, the container 81 foil 85 gives way and the RFID tag 88 antenna 83 is disabled.

In yet another embodiment of the present invention is an RFID tag bonded to a polyvinyl chloride film, super shrink polyolefin film, polyproplene or any other alternative shrinkable material useful in the process of wrapping product. FIG. 4g illustrates a full body shrink label 90 with an attached or bonded RFID tag 91, antenna 92 that spans a perforation and/or pull tab 93. After full body shrink label 90 is applied to a product, such as by way of illustration container 94, the perforation and/or tab 93 is utilized in accessing container 94. When the perforation and/or tag 93 is torn to access container 94, antenna 92 is destroyed thereby disabling RFID tag 91 indicating the product has been used or accessed.

In yet another embodiment of the present invention an RFID tag by way of example and not limitation is bonded via thermal, mechanical pressure or adhesive to a seal such as band 95, which may be manufactured from polyvinyl chloride film, super shrink polyolefin film or polypropylene, all useful in the process of sealing a product. Such bands are useful in protecting the integrity of the contents of the container. FIG. 4h illustrates a seal in the form of a shrink band 95 with an attached or bonded RFID tag 91. The RFID tag 91 antenna 92 is integral to the seal whereby a perforation or pull tab 93 of the band 95 provides the disabling means to act upon the seal and to disable the antenna. Antenna 92 of tag 91 spans a perforation or pull tab 93 of the band 95. After the shrink band 95 is applied around a product 94 top or cap 99, the perforation and/or pull tab 93 may be utilized to access container 94. In this accessing process, antenna 93 is destroyed thereby disabling RFID tag 91 indicating the product in container 94 has been used or accessed.

In yet another embodiment of the present invention an RFID tag bonded to a shrinkable material as previously mentioned useful for wrapping a product. FIG. 4i illustrates a shrink bag 95a with an attached or bonded RFID tag 91, and antenna 92 that spans a perforation and/or established pull tab 93. After the shrink bag 95a is applied around product 96, the perforation and/or tab 93 is utilized in accessing product 96. In this accessing process, antenna 92 is destroyed disabling RFID tag 91 indicating the product 96 has been used or accessed.

FIG. 4j illustrates a shrinkable bag 95b with an attached or bonded as previously mentioned RFID tag 91 and an associated grid antenna 97 having a plurality of elemental antenna that span perforations and/or tab 98. When either of the perforations and/or tabs 98 is pulled, it forces at least one element of the grid antenna 97 to be dysfunctional from the RFID tag 91 indicating the product has been used or accessed.

FIG. 4k illustrates by way of example and not limitation, a full body shrink label 90 with an attached or bonded RFID tag 91 and an associated grid antenna 97 have a plurality of elemental antenna that spans all perforations and/or tab 98. The RFID tag 91 by way of example and not limitation is bonded via thermal, mechanical pressure or adhesive to the label such as a shrink label, which may be manufactured from polyvinyl chloride film, super shrink polyolefin film or polypropylene, all useful in the process of labeling a product. Other labels may be manufactured from paper or other well-known materials utilized in the manufacture of labels. When either of the perforations and/or tabs 98 is pulled it forces at least one element of the grid antenna 97 to be severed from the RFID tag 91 indicating the product has been used or accessed.

By way of non limiting example, the antenna for the illustrated RFID tags can be applied to the shrinkable material useful for wrapping a product with the same rotogravure and/or flexography printing technique (in this case with metal infused inks) utilized for Universal Product Codes or non or high gloss printed labels.

Those skilled in the art of computer programming will appreciate that the invention may be implemented in a system of computer units communicatively coupled to one another over a network, such as a wide area network, local area network or the global interconnection of computers and computer networks commonly referred to as the Internet. Such a network may typically include one or more microprocessor based computing devices, such as personal computers. "Personal computer", as referred to herein, generally refers to a general purpose computing device that includes a processor. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory may be internal or external to an integrated unit including a personal computer. Memory preferably stores a computer program, e.g., sequence of instructions being operable by a processor.

By way of further non-limiting example, in a distributed implementation, the system may typically include a local area network (LAN) of terminals or workstations (e.g., PCs), telephone interfaces, database file servers, input devices and output devices configured by software for accumulating, processing, administering and analyzing attributes in an automated workflow environment. "Server", as used herein, generally refers to a computer or device communicatively coupled to a network that manages network resources. For example, a file server is a computer and storage device dedicated to storing files, while a database server is a computer system that processes database queries. A server may refer to a discrete computing device, or may refer to the program that is managing resources rather than an entire computer.

By way of further, non-limiting example, FIG. 5 system 500 generally includes one or more computers 132, including a CPU 147 having an arithmetic logic unit (ALU) 137 for making mathematical calculations, and associated memory registers, program controls, input output circuitry; a memory 134 and one or more file storage mediums 142 internal or external to computer 132 for storing data, a disk storage medium, disk drive 136, and disk drive 142 to aid in the storage of and to store selected data. Interfaces 138,140 between computer 132 and external accessories, such as a display monitor 120, keyboard 148, pointing device 119 and a printer 122, may also be provided. Interface 138 may also facilitate access to a local area network or other network of computers (neither illustrated), e.g., data transfer input/output, if required or desired. CPU 136 both controls, and is controlled by, other hardware, as well as software stored in memory 134 and on a portion of storage medium 142. In the illustrated case, storage medium 142 takes the form of a hard disk drive being internal to computer 132.

The invention herein is also drawn to a method of managing inventory. In one embodiment, the method includes the steps of: placing items having associated RFID tags into an inventory store or container; electronically interrogating the associated RFID tags and making an immediate record thereof; electronically interrogating the associated RFID tags upon removal of an item from the container; immediately recording the item removed from the container; updating one or more files in a billing and inventory management system to indicate the item having been removed; periodically electronically interrogating an area containing the item that had been removed from the container; and if the item having an associated RFID tag does not respond to the interrogating device, then updating one or more files in the billing and inventory management systems to indicate the non responsive event; and if the item has been returned to the container then immediately updating one or more files in the billing and inventory management systems. More particularly, with reference to FIG. 6, the method 600 for tracking inventory comprises: stocking an inventory store 160; interrogating with a transceiver a radio frequency identification device associated with one or more articles in the inventory store 165; processing 170 a communication with the transceiver to record the one or more articles entering the inventory store to increase inventory; initializing a timer 175 when the one or more articles are removed from the inventory store; interrogating 180 the one or more articles removed from the inventory store; and (a) decreasing 198 the inventory for the one or more articles if the radio frequency identification device of one or more articles removed from the inventory store indicates the one or more articles have been used 185 to the transceiver interrogation; and (b) not changing 190 the inventory for the responding one or more articles if the radio frequency identification device of one or more articles removed from the inventory store response indicates the one or more articles have not been used provided that the reentering the one or more articles into the interrogation field or the inventory store occurs before the timer times out 195.

In one embodiment whether the one or more articles have been used is determined if the radio frequency identification device is destroyed. In yet another embodiment, whether the one or more articles have been used is determined if the antenna is severed as an indication of article usage. In yet another embodiment, whether the one or more articles have been used is determined if an associated pair of radio frequency identification devices installed on an article produce receptions at different intervals of time. In yet another embodiment, whether the one or more articles have been used is determined if a first radio frequency identification device antenna is destroyed and a second radio frequency identification device antenna remains functional.

It is expressly intended that all combinations of those elements that perform substantially the same function in substantially the same way to achieve the same results are within the scope of the invention. Substitutions of elements from one described embodiment to another are also fully intended and contemplated.

I claim:

1. A system for tracking inventory comprising: an inventory store; one or more transceivers for interrogating one or more radio frequency identification devices associated with one or more articles; a processor in communication with the transceivers; code operable by the processor to increase the inventory when the one or more articles enter the inventory store; code operable by the processor to initiate a timer when the one or more articles are removed from the inventory store; code operable by the processor to decrease the inventory if one or more transceiver interrogations of a field indicate that the one or more articles removed from the inventory store does not respond to the interrogation or have been used; and whereby if one or more transceiver interrogations of a field indicate that the one or more articles removed from the inventory store have not been used, then the inventory is unchanged for the responding one or more articles provided that the timer has not timed out.

2. The system of claim 1, includes one or more transceiver/repeater combinations to enable interrogation of all associated radio frequency identification devices within a space.

3. The system of claim 1, including a universal product code reader to self purchase articles.

4. The system of claim 1, wherein the radio frequency identification device is adapted to be destroyed as an indication of the removed item being used.

5. The system of claim 1, wherein when the article is opened the antenna is dysfunctional as an indication of article usage.

6. The system of claim 1, wherein an associated pair of radio frequency identification devices are installed on an article.

7. The system of claim 1 wherein the transceiver detects the reception of two associated radio frequency identification devices at different intervals of time as indication that the article has been used.

8. The system of claim 1 wherein two or more transceivers determine if an associated pair of radio frequency identification devices each installed on separate parts of an article produce receptions from different locations as an indication that the article has been used.

9. The system of claim 6, whereupon opening of the article a first radio frequency identification device antenna is made dysfunctional and a second radio frequency identification device antenna remains functional.

10. The system of claim 7, wherein different intervals of time indicate that the separate parts of the article associated with the pair of radio frequency identification devices have been separated.

11. A method for tracking inventory comprising: stocking an inventory store; interrogating a radio frequency identification device associated with one or more articles in the inventory store; processing a communication to record the one or more articles entering the inventory store to increase inventory; initializing a timer when the one or more articles are removed from the inventory store; interrogating the one or more articles removed from the inventory store; and (a) decreasing the inventory for the one or more articles if the radio frequency identification device of one or more articles removed from the inventory store indicate that the one or more articles have been used; and (b) not changing the inventory for the responding one or more articles if the radio frequency identification device of one or more articles removed from the inventory store response indicate the one or more articles have not been used provided that the reentering the one or more articles into the interrogation field or the inventory store occurs before the timer times out.

12. The method of claim 11 wherein the one or more articles have been used is determined if the radio frequency identification device is disabled.

13. The method of claim 11 wherein the one or more articles have been used is determined if the antenna is disabled on one or more articles.

14. The method of claim 11 wherein the one or more articles have been used is determined if an associated pair of radio frequency identification devices installed on an article produce receptions at different intervals of time.

15. The method of claim 11 wherein the one or more articles have been used is determined if an associated pair of radio frequency identification devices installed on an article produce receptions from different locations.

16. The method of claim 11 wherein the one or more articles have been used is determined if a first radio frequency identification device antenna is disabled and a second radio frequency identification device antenna remains functional.

* * * * *